US009841603B2

United States Patent
Halpin et al.

(10) Patent No.: US 9,841,603 B2
(45) Date of Patent: Dec. 12, 2017

(54) ELECTRONIC EYEWEAR VIEWING DEVICE

(71) Applicant: Kopin Corporation, Westborough, MA (US)

(72) Inventors: Declan Halpin, New Bedford, MA (US); Lee A. Kuczewski, Brooklyn, NY (US); Ernesto Carlos Martinez Villalpando, Shrewsbury, MA (US)

(73) Assignee: Kopin Corporation, Westborough, MA (US)

( * ) Notice: Subject to any disclaimer, the term of this patent is extended or adjusted under 35 U.S.C. 154(b) by 0 days.

(21) Appl. No.: 15/050,645

(22) Filed: Feb. 23, 2016

(65) Prior Publication Data

US 2016/0246059 A1    Aug. 25, 2016

Related U.S. Application Data

(60) Provisional application No. 62/152,998, filed on Apr. 27, 2015, provisional application No. 62/119,866, filed on Feb. 24, 2015.

(51) Int. Cl.
*G02C 5/00* (2006.01)
*G02B 27/01* (2006.01)
(Continued)

(52) U.S. Cl.
CPC .. *G02B 27/0176* (2013.01); *G02B 2027/0178* (2013.01); *G02C 5/2281* (2013.01); *G02C 11/10* (2013.01)

(58) Field of Classification Search
CPC ........ G02B 27/0176; G02B 2027/0178; G02C 5/2281; G02C 11/10
(Continued)

(56) References Cited

U.S. PATENT DOCUMENTS 4,704,000 A    11/1987    Pekar
4,865,438 A     9/1989    Wada
(Continued)

FOREIGN PATENT DOCUMENTS

DE    202012003317    8/2012
EP    0 551 781 A1    7/1993
(Continued)

*Primary Examiner* — Tuyen Tra
(74) *Attorney, Agent, or Firm* — Hamilton, Brook, Smith & Reynolds, P.C.

(57) ABSTRACT

An electronic eyewear viewing device including a display module having a microdisplay for viewing images. The microdisplay can have an exit window aligned along a first lateral axis $L_1$. The display module can have a pivot joint along a second lateral axis $L_2$ parallel to and spaced apart from the first lateral axis $L_1$. The display module can be rotatable about the pivot joint. A lateral position adjustment screw can be mounted and rotatably secured to the display module for laterally adjusting position of the display module. A rotational position adjustment screw can be mounted along a transverse axis that is transverse to the second lateral axis $L_2$ and rotatably secured to the display module at a location offset from the second lateral axis $L_2$ for adjusting rotational position of the display module about the pivot joint along the second lateral axis $L_2$.

26 Claims, 23 Drawing Sheets

(51) Int. Cl.
*G02C 5/22* (2006.01)
*G02C 11/00* (2006.01)

(58) Field of Classification Search
USPC .................. 351/153, 140, 41; 359/630, 632
See application file for complete search history.

(56) References Cited

U.S. PATENT DOCUMENTS

| | | | |
|---|---|---|---|
| 4,986,649 | A | 1/1991 | Smith |
| 5,892,564 | A | 4/1999 | Rahn |
| D432,508 | S | 10/2000 | Park et al. |
| 6,351,252 | B1 | 2/2002 | Atsumi et al. |
| 6,424,321 | B1 | 7/2002 | Ronzani et al. |
| 6,978,478 | B2 | 12/2005 | Urakawa et al. |
| D628,616 | S | 12/2010 | Yuan |
| D671,590 | S | 11/2012 | Klinar et al. |
| D680,152 | S | 4/2013 | Olsson et al. |
| 8,446,676 | B2 * | 5/2013 | Sugihara ............ G02B 27/0176 353/119 |
| D687,087 | S | 7/2013 | Iurilli |
| 8,542,326 | B2 | 9/2013 | MacNaughton et al. |
| D694,311 | S | 11/2013 | Cho et al. |
| 8,643,568 | B2 | 2/2014 | West et al. |
| 8,777,406 | B2 | 7/2014 | Sugihara et al. |
| D710,928 | S | 8/2014 | Heinrich et al. |
| D716,808 | S | 11/2014 | Yeom et al. |
| D718,305 | S | 11/2014 | Olsson et al. |
| D719,568 | S | 12/2014 | Heinrich et al. |
| D719,569 | S | 12/2014 | Heinrich et al. |
| D719,570 | S | 12/2014 | Heinrich et al. |
| D719,952 | S | 12/2014 | Kim et al. |
| D724,082 | S | 3/2015 | Olsson et al. |
| D724,083 | S | 3/2015 | Olsson et al. |
| D727,317 | S | 4/2015 | Olsson et al. |
| D738,373 | S | 9/2015 | Davies et al. |
| 2003/0090439 | A1 | 5/2003 | Spitzer et al. |
| 2005/0237271 | A1 | 10/2005 | Yamamoto |
| 2010/0110368 | A1 | 5/2010 | Chaum |
| 2010/0245754 | A1 | 9/2010 | Matsumoto |
| 2010/0245757 | A1 | 9/2010 | Sugihara et al. |
| 2010/0253904 | A1 | 10/2010 | Jannard |
| 2012/0013843 | A1 | 1/2012 | Jannard |
| 2012/0105740 | A1 | 5/2012 | Jannard et al. |
| 2013/0044042 | A1 | 2/2013 | Olsson et al. |
| 2013/0235331 | A1 | 9/2013 | Heinrich |
| 2014/0266986 | A1 | 9/2014 | Magyari |
| 2015/0301360 | A1 | 10/2015 | Chow et al. |
| 2016/0223820 | A1 | 8/2016 | Chow et al. |
| 2017/0108714 | A1 | 4/2017 | Kuczewski et al. |

FOREIGN PATENT DOCUMENTS

| | | |
|---|---|---|
| JP | D1470899 | 6/2013 |
| TW | D132974 | 1/2010 |
| TW | D138236 | 12/2010 |
| WO | WO 2013/185224 A1 | 12/2013 |
| WO | WO 2014/093284 A1 | 6/2014 |
| WO | WO 2016/077696 A1 | 5/2016 |

\* cited by examiner

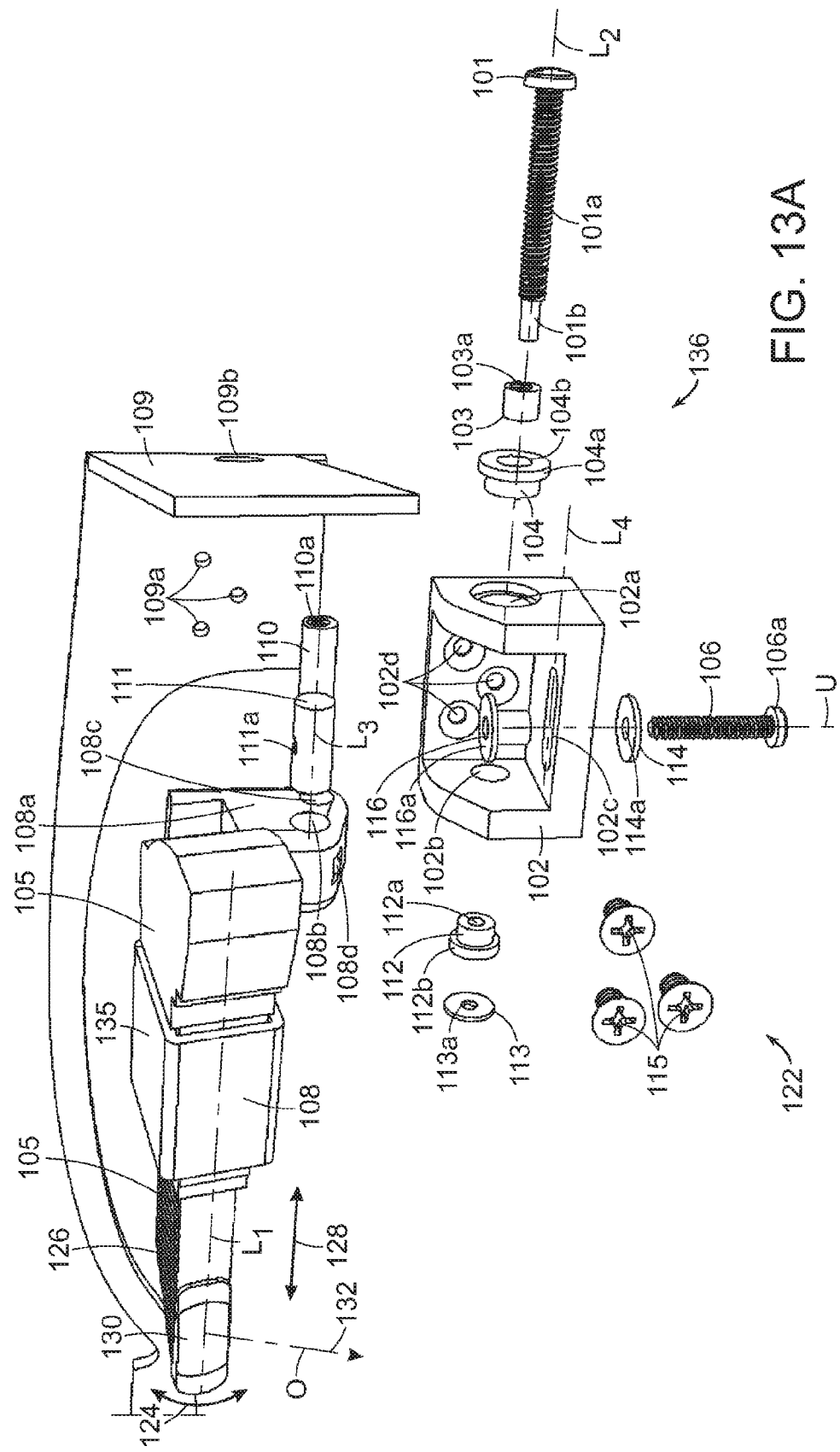

ELECTRONIC EYEWEAR VIEWING DEVICE

RELATED APPLICATIONS

This application claims the benefit of U.S. Provisional Application No. 62/152,998, filed Apr. 27, 2015 and U.S. Provisional Application No. 62/119,866, filed Feb. 24, 2015. The entire teachings of the above applications are incorporated herein by reference.

BACKGROUND

Electronic eyewear viewing devices in the prior art tend to be much larger or bulkier than conventional corrective eyeglasses. Users wearing electronic eyewear having a display module with a microdisplay, can view images generated by the microdisplay. However, since different users have different head and eye dimensions, a fixed display module does not always provide optimum viewing for some users.

SUMMARY

The present invention can provide an electronic eyewear viewing device that can have a slim elegant eyewear design relatively close to that of conventional corrective eyewear, while at the same time providing adjustability of an optical display module to facilitate viewing experience.

The present invention can provide an electronic eyewear viewing device having an electronic display that can be adjusted by a compact adjustment mechanism. The present invention can provide an electronic eyewear viewing device including a display module having a microdisplay for viewing images. The microdisplay can have an exit window aligned along a first lateral axis $L_1$. The display module can have a pivot joint along a second lateral axis $L_2$ parallel to and spaced apart a distance from the first lateral axis $L_1$. The display module can be rotatable about the pivot joint. A lateral position adjustment screw can be mounted and rotatably secured to the display module for laterally adjusting position of the display module. A rotational position adjustment screw can be mounted along a transverse axis that is transverse to the second lateral axis $L_2$ and rotatably secured to the display module at a location offset from the second lateral axis $L_2$ for adjusting rotational position of the display module about the pivot joint along the second lateral axis $L_2$. The distance that the exit window of the microdisplay along the first lateral axis $L_1$ is spaced apart from the pivot point and the second lateral axis $L_2$ providing a larger radius of rotation for the exit window than if the exit window was positioned along the second lateral axis $L_2$.

In particular embodiments, the lateral position adjustment screw can be mounted along the second lateral axis $L_2$ and rotatably secured to the pivot joint of the display module for laterally adjusting position of the display module along the second lateral axis $L_2$. The second lateral axis $L_2$ can be positioned below the first lateral axis $L_1$. The transverse axis can be in an upright orientation generally perpendicular to the second lateral axis $L_2$. The lateral position adjustment screw can have screw threads which engage mating threads of a lateral movement sleeve positioned at the pivot joint of the display module along the second lateral axis $L_2$ for providing lateral adjustment of the display module. The rotational adjustment screw has screw threads which can engage mating threads of a rotational movement sleeve positioned in the display module and rotationally mounted along a third lateral axis $L_3$ parallel to and spaced apart from the second lateral axis $L_2$. The rotational movement sleeve can rotate about the third lateral axis $L_3$ to allow the screw threads of the rotational adjustment screw to engage the mating threads of the rotational movement sleeve as rotational position of the display module is adjusted. A frame can be included, and the display module can be rotatably mounted at the pivot joint along the second lateral axis $L_2$ to the frame by the lateral position adjustment screw. The frame can have a lateral track extending along a fourth lateral axis $L_4$ parallel to and spaced apart below the third lateral axis $L_3$. The rotational position adjustment screw can be slidably mounted to the lateral track to move with lateral adjustment of the display module. In some embodiments, the frame can include an eyewear frame. In other embodiments, the frame can have a display housing bracket for mounting to an eyewear frame. The frame can further include a brow bar bracket mounted to the eyewear frame to which the display housing bracket is mounted.

In some embodiments, the pivot joint can pivotably connect together first and second arms of a pivoting mechanism along the second lateral axis $L_2$. The rotational position adjustment screw can be mounted to the first and second arms for adjusting the rotational position of the first and second arms relative to each other for adjusting the rotational position of the display module. The pivoting mechanism can be secured to a housing of the microdisplay. The first and second arms can be integrally formed together. The pivot joint can comprise a bendable section extending along the second lateral axis $L_2$ that bends to pivot the first and second arms relative to each other. The first and second arms can be upper and lower arms, respectively. The lateral position adjustment screw can be rotatably secured to the upper arm for laterally adjusting position of the display module and the lower arm can be secured to the housing of the microdisplay. Rotation of the rotational position adjustment screw can adjust rotational position of the display module. An eyewear frame can be further included. The pivoting mechanism can be slidably mounted to the eyewear frame between two end stops. The lateral position adjustment screw can be rotatably secured between the two ends stops and to the upper arm of the pivoting mechanism positioned between the two end stops.

The present invention can also provide a method of adjusting a display module of an electronic eyewear viewing device. The display module can have a microdisplay for viewing images. The microdisplay can have an exit window aligned along a first lateral axis $L_1$. The display module can be provided with a pivot joint aligned along a second lateral axis $L_2$ that is parallel to and spaced apart a distance from the first lateral axis $L_1$. The display module can be rotatable about the pivot joint. Lateral position of the display module can be adjusted with a lateral position adjustment screw rotatably secured to the display module. Rotational position of the display module about the pivot joint along the second lateral axis $L_2$ can be adjusted with a rotational position adjustment screw mounted along a transverse axis that is transverse to the second lateral axis $L_2$ and rotatably secured to the display module at a location offset from the second lateral axis $L_2$. The distance that the exit window of the microdisplay along the first lateral axis $L_1$ is spaced apart from the pivot joint and the second lateral axis $L_2$ can provide a larger radius of rotation for the exit window than if the exit window was positioned along the second lateral axis $L_2$.

In particular embodiments, lateral position of the display module can be adjusted along the second lateral axis $L_2$ with a lateral position adjustment screw mounted along the second lateral axis $L_2$ and rotatably secured to the pivot joint of the display module. The second lateral axis $L_2$ can be positioned below the first lateral axis $L_1$. The transverse axis can be in an upright orientation generally perpendicular to the second lateral axis $L_2$. Screw threads of the lateral position adjustment screw can engage with mating threads of a lateral movement sleeve positioned at the pivot joint of the display module along the second lateral axis $L_2$ for providing lateral adjustment of the display module. Screw threads of the rotational adjustment screw can engage with mating threads of a rotational movement sleeve positioned in the display module that is rotationally mounted along the third lateral axis $L_3$ parallel to and spaced apart from the second lateral axis $L_2$. The rotational movement sleeve can rotate about the third lateral axis $L_3$ to allow the screw threads of the rotational adjustment screw to engage the mating threads of the rotational movement sleeve as rotational position of the display module is adjusted. The display module can be rotatably mounted at the pivot joint along the second lateral axis $L_2$ to a frame by the lateral position adjustment screw. The rotational position adjustment screw can be slidably mounted to a lateral track of the frame extending along a fourth lateral axis $L_4$ parallel to and spaced below the third lateral axis $L_3$. In some embodiments, an eyewear frame can be provided as the frame. In other embodiments, the frame can be provided with a display housing bracket for mounting to an eyewear frame. The frame can be provided with a brow bar bracket mounted to the eyewear frame to which the display housing bracket can be mounted.

In some embodiments, the first and second arms of a pivoting mechanism can be pivotably connected together with the pivot joint along the second lateral axis $L_2$. The rotational position adjustment screw can be mounted to the first and second arms for adjusting the rotational position of the first and second arms relative to each other for adjusting rotational position of the display module. The pivoting mechanism can be secured to a housing of the microdisplay. The first and second arms can be integrally formed together. The pivot joint can comprise a bendable section extending along the second lateral axis $L_2$. The pivot joint can bend to pivot the first and second arms relative to each other. The first and second arms can be upper and lower arms, respectively. The lateral position adjustment screw can be rotatably secured to the upper arm for laterally adjusting position of the display module. The lower arm can be secured to the housing of the microdisplay. Rotation of the rotational position adjustment screw adjusts rotational position of the display module. The pivoting mechanism can be slidably mounted to an eyewear frame between two end stops. The lateral position adjustment screw can be rotatably secured between the two end stops and to the upper arm of the pivoting mechanism positioned between the two end stops.

The present invention can also provide an electronic eyewear viewing device including a front eyewear frame portion having an upper rim with an upper surface. An elongate wiring channel can extend into the upper rim through the upper surface. The wiring channel can extend laterally through and along the upper rim and through opposing first and second ends of the upper rim, and include a bottom wiring channel portion for containing electrical wires passing therethrough. A frame bracket having an elongate front bracket portion can extend along and can be secured within the wiring channel above the bottom wiring channel portion and cover the wires therein. The frame bracket can include first and second corner bracket portions extending from the wiring channel at respective first and second ends of the front eyewear frame portion. The first and second corner bracket portions can extend rearwardly from the front eyewear frame portion. An adjustable display module having a microdisplay for viewing images can be included. The adjustable display module can be mounted to at least one of the first and second corner bracket portions. The adjustable display module can include an adjustment mechanism for providing linear lateral adjustment of the microdisplay relative to the front eyewear frame portion along a lateral axis, and pivotable adjustment of the microdisplay about the lateral axis.

In particular embodiments, the first and second side frame portions can be pivotably mounted to respective first and second corner bracket portions. The first and second side frame portions can be for resting on a user's ears. First and second hinge elements can be secured to respective first and second corner bracket portions of the frame bracket for pivotably mounting to the first and second side frame portions. One of the first and second hinge elements can be part of the adjustable display module. The first and second hinge elements and the first and second side frame portions can contain wiring passages for allowing the passage of wiring there between. The adjustable display module can include a lateral movement adjustment screw for providing lateral adjustment and a worm wheel for providing pivotable adjustment, mounted to the microdisplay along the lateral axis, and held within a cavity in a corner shaped housing by a retaining member. The worm wheel can be engaged by a rotatable worm that is rotatably mounted to the corner shaped housing for engaging the worm wheel, and held in place by an assembly cover. The corner shaped housing of the adjustable display module can be a first corner shaped housing and include the first hinge element. A second corner shaped housing can include the second hinge element. The first and second corner shaped housings can be secured to inner surfaces of respective first and second corner bracket portions of the frame bracket. The elongate front bracket portion of the frame bracket can have a narrow thickness and a short height. The first and second corner bracket portions can be bent rearwardly from the front bracket portion and include a total height greater than the height of the front bracket portion, that is large enough to mount the adjustable display module to at least one of the first and second corner bracket portions.

The present invention can also provide an electronic eyewear viewing device including a front eyewear frame portion having an upper rim with an upper surface. An elongate wiring channel can extend into the upper rim through the upper surface. The wiring channel can extend laterally through and along the upper rim and through opposing first and second ends of the upper rim, and include a bottom wiring channel portion for containing electrical wires passing therethrough. A frame bracket can have an elongate front bracket portion with a narrow thickness and a short height extending along and secured within the wiring channel above the bottom wiring channel portion and covering the wires therein. The frame bracket can include first and second corner bracket portions extending from the wiring channel at respective first and second ends of the front eyewear frame portion. The first and second corner bracket portions can be bent and extend rearwardly from the front eyewear frame portion and have a total height greater than the height of the front bracket portion. An adjustable display module having a microdisplay for viewing images can be mounted to an inner curved surface of one of the first and second corner bracket portions. The adjustable display module can include an adjustment mechanism for providing linear lateral adjustment of the microdisplay relative to the front eyewear frame portion along lateral axis, and pivotable adjustment of the microdisplay about the lateral axis.

The present invention can also provide a method of assembling an electronic eyewear viewing device including providing a front eyewear frame portion having an upper rim with an upper surface. An elongate wiring channel can extend into the upper rim through the upper surface. The wiring channel can extend laterally through and along the upper rim and through opposing first and second ends of the upper rim, and include a bottom wiring channel portion containing electrical wires passing therethrough. A frame bracket having an elongate front bracket portion can be secured and extend along and within the wiring channel above the bottom wiring channel portion and covering the wires therein. The frame bracket can include first and second corner bracket portions extending from the wiring channel at respective first and second ends of the front eyewear frame portion. The first and second corner bracket portions can extend rearwardly from the front eyewear frame portion. An adjustable display module having a microdisplay for viewing images can be mounted to a least one of the first and second corner bracket portions. The adjustable display module can include an adjustment mechanism for providing linear lateral adjustment of the microdisplay relative to the front eyewear frame portion along the lateral axis, and pivotable adjustment of the microdisplay about the lateral axis.

In particular embodiments, first and second side frame portions can be pivotably mounted to respective first and second corner bracket portions. The first and second side frame portions can be for resting on a user's ears. First and second hinge elements can be secured to respective first and second corner bracket portions of the frame bracket for pivotably mounting to the first and second side frame portions. One of the first and second hinge elements can be part of the adjustable display module. The first and second hinge elements and the first and second side frame portions can be provided with wiring passages for allowing the passage of wiring therebetween. The adjustable display module can include a corner shaped housing, which can hold a lateral movement adjustment screw for providing lateral adjustment and a worm wheel for providing pivotable adjustment, which are mounted to the microdisplay along the lateral axis within a cavity in the corner shaped housing, with a retaining member. The worm wheel can be engaged by rotatable worm that is rotatably mounted to the corner shaped housing for engaging the worm wheel, and can be held in place by an assembly cover. The corner shaped housing of the adjustable display module can be a first corner shaped housing and include the first hinge element. A second corner shaped housing includes the second hinge element. The first and second corner shaped housings can be secured to inner surfaces of respective first and second corner bracket portions of the frame bracket. The elongate front bracket portion of the frame bracket can be provided with a narrow thickness and a short height. The first and second corner bracket portions can be provided with rearwardly bends from the front bracket portion, and a total height greater than the height of the front bracket portion, that is large enough to mount the adjustable display module to at least one of the first and second corner bracket portions.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 13A is an enlargement of FIG. 13 with additional annotation.

DETAILED DESCRIPTION OF THE INVENTION

Figure 1:
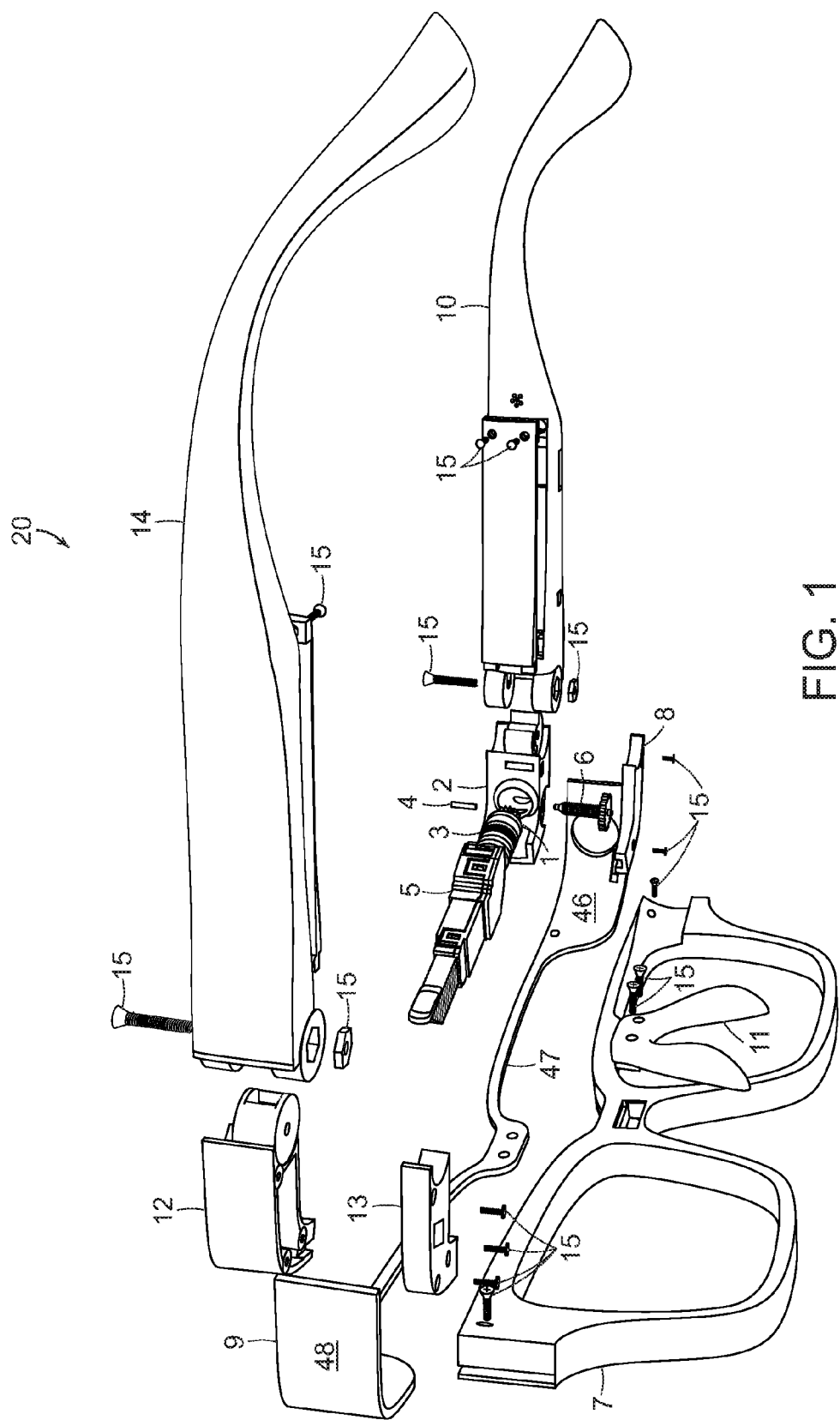
FIG. 1 is a rear lower left perspective exploded view of an embodiment of an electronic eyewear viewing device in the present invention.

A description of example embodiments of the invention follows.

Referring to FIGS. 1-12, in embodiments of the present invention, an electronic eyewear viewing system or device 20 (FIG. 1A) can be a computer-integrated eyeglass system having an adjustable display module 22 with an active matrix display or microdisplay 26 mounted to a modular eyewear, spectacle or eyeglass frame 34. The eyewear frame 34 can generally include a front eyewear frame portion or frame chassis 7, a frame bracket or interlocking brow bar 9, a first or right side frame portion, stem or temple 10, and a second or left side frame portion, stem or temple 14. The microdisplay 26 can be electronically, processor or computer driven and can display images 32, including text and/or video on a small display screen or image exit window 30 along an optical axis O. The adjustable display module 22 can adjust the position of the image exit window 30 and optical axis O laterally in a linear direction along lateral axis L in the direction of arrows 28 to adjust for interpupillary distance (IPD), and pivotably or rotatably adjust the position about or around lateral axis L in the direction or arrows 24 to angle or tilt the image exit window 30 and optical axis O to the user's eye, such as slightly angled or tilted downwardly. The adjustable display module 22 can be mechanically adjustable.

Figure 2:
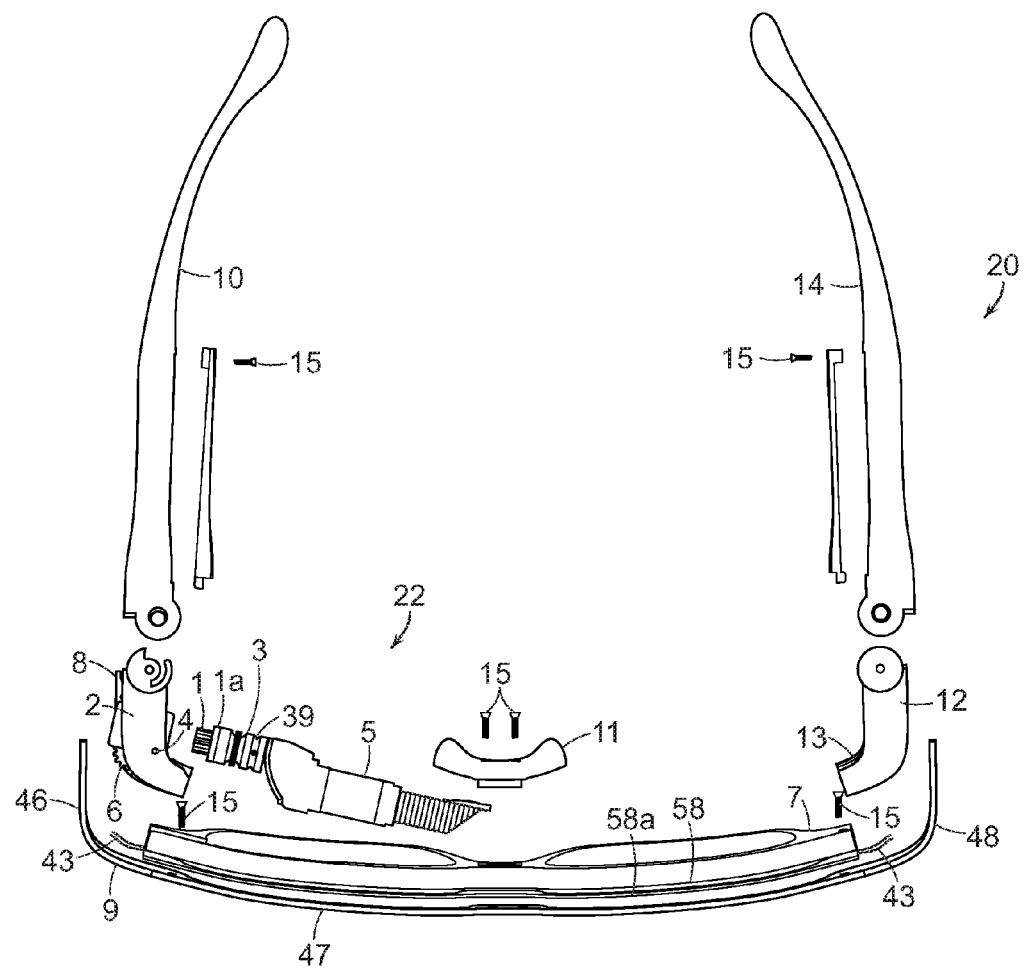
FIG. 2 is an exploded top view thereof.
Figure 3:
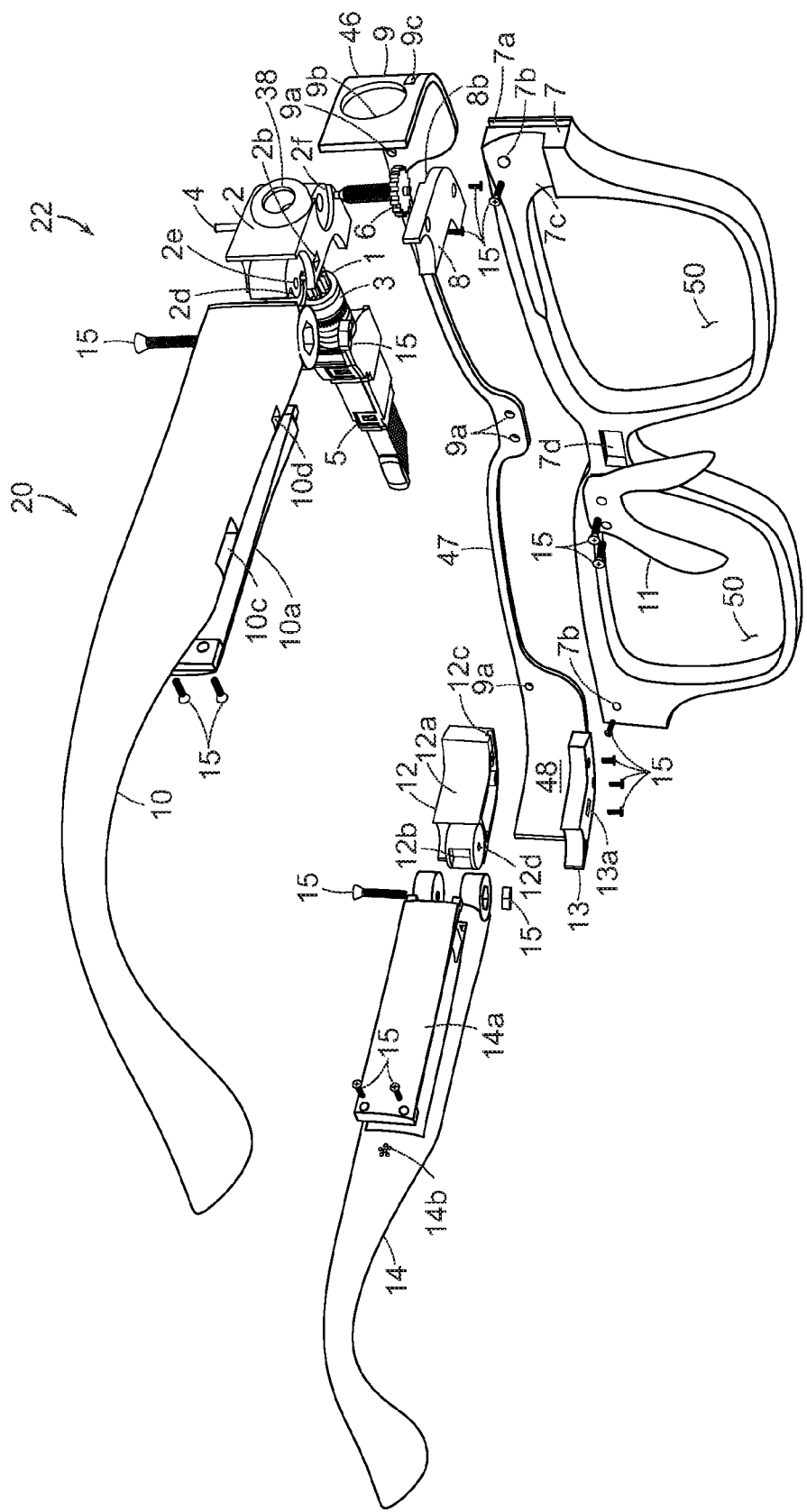
FIG. 3 is a rear lower right perspective exploded view thereof.
Figure 4:
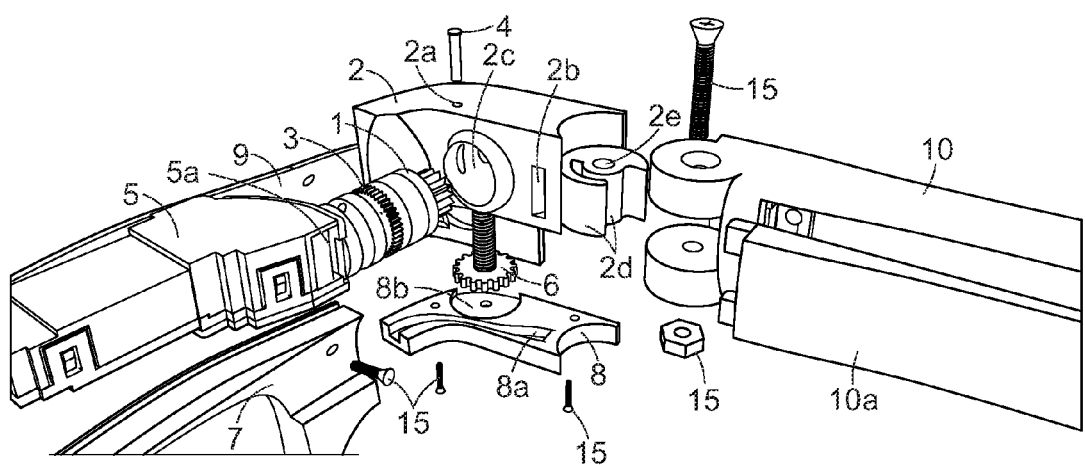
FIG. 4 is an exploded upper perspective view of the right hand corner thereof.
Figure 4A:
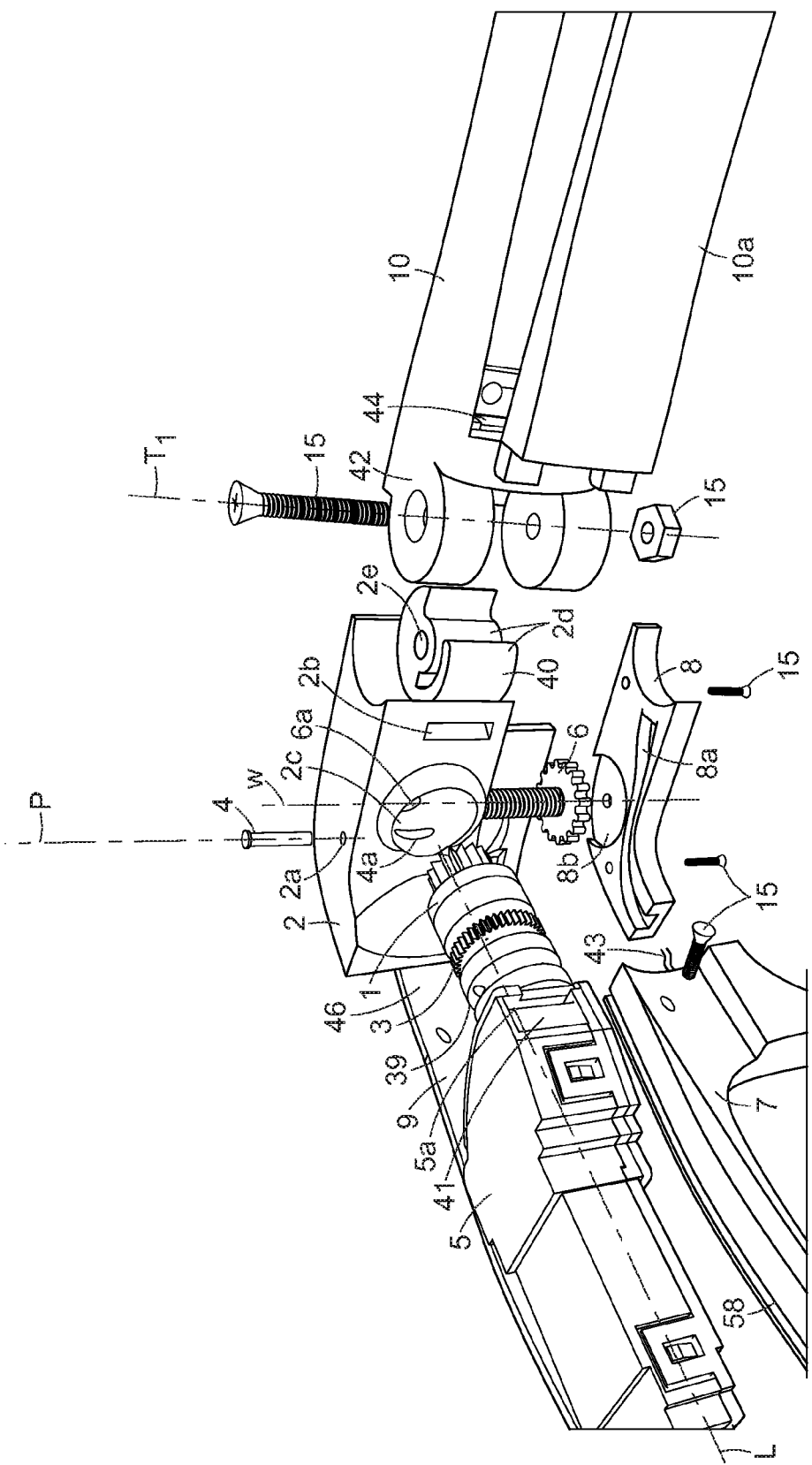
FIG. 4A is an enlargement of FIG. 4 including further annotations.
Figure 11:
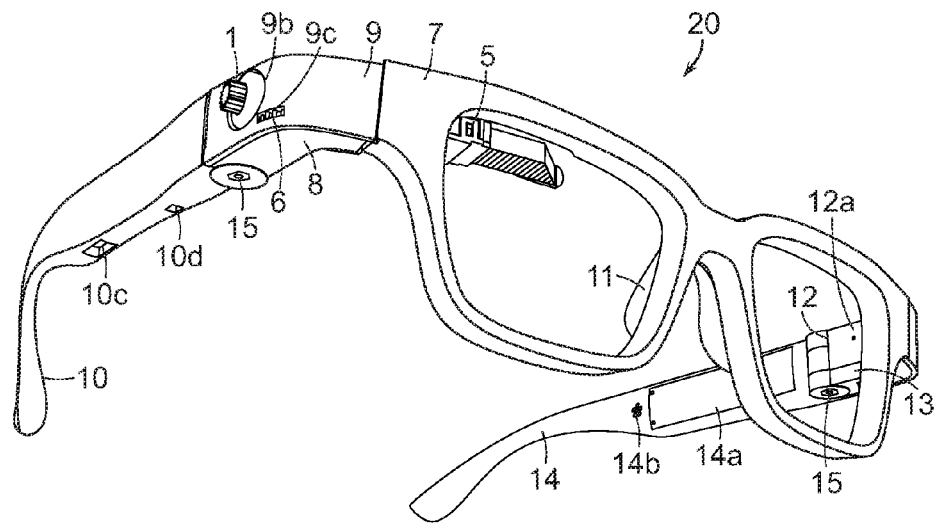
FIG. 11 is a lower front side perspective view thereof.

The adjustable display module 22 can include the microdisplay 26 and an adjustment mechanism 36, mounted to a first or right corner shaped housing or module, or motion mechanism housing/hinge 2. The corner shaped housing 2 can be secured or mounted to a first or right corner bracket portion 46 of the frame chassis 7. The adjustment mechanism 36 can include a rotatable threaded interpupillary adjustment screw 1 for providing linear lateral adjustment of the microdisplay 26 along lateral axis L in the direction of arrows 28, and a rotatable or pivotable worm wheel, gear or drive, or worm gear wheel 3 that is engagingly driven by a worm or worm screw, or worm gear and shaft 6 for providing rotatable or pivotable adjustment of the microdisplay 26 about axis L in the direction of arrows 24. The adjustment screw 1 and the worm wheel 3 are rotatably mounted to the corner shaped housing 2 about lateral axis L, and can be inserted into a generally round worm drive, bore, hole, opening or cavity 2c (FIGS. 4 and 4A) from the inner side and locked or held in place by a retaining member or IPD adjustment limiter pin 4 within IPD adjustment limiter pin hole 2a. The pin 4 and pin hole 2a can extend along a pin axis P that can be upright or perpendicular to lateral axis L. The pin 4 can extend through an opening 4a in the side of cavity 2c to engage and hold the worm wheel 3 and adjustment screw 1 in place within cavity 2c, such as engaging a notch, opening, shoulder or groove 39 (FIGS. 2 and 4A). The adjustment screw 1 can extend through cavity 2c to extend from or through the outer side of corner shaped housing 2 (FIGS. 3 and 11). The cavity 2c can have an internal shoulder 38 (FIG. 3) for engaging a shoulder 1a (FIG. 2) of the adjustment screw 1 for laterally trapping the adjustment screw 1 and worm wheel 3 between the shoulder 38 and pin 4.

As a result, the adjustment screw 1 can be rotated within cavity 2c, and by screw threads engaging a threaded hole in a portion of microdisplay 26 or a member attached thereto, move and adjust the lateral position of the microdisplay 26 linearly along lateral axis L. The thread or teeth of worm 6 can be rotatably mounted to corner shaped housing 2 about upright axis W perpendicular to lateral axis L within a hole or opening 6a (FIG. 4A). The knurled knob or thumb wheel of worm 6 can be rotatably captured or trapped within or between a circular worm screw registration track 2f (FIG. 5) in housing 2 and a circular worm screw registration track 8b within the housing/hinge assembly cover 8, which is secured to the bottom of housing 2 by screws 15. Hole 6a extends through the side of cavity 2c for allowing the thread or teeth of worm 6 to rotatably engage the gear teeth of worm wheel 3 for rotating worm wheel 3 and microdisplay 26 about lateral axis L to adjust pivotable or angular position of the microdisplay 26 about lateral axis L. An edge of the thumb wheel of the worm 6 can extend through a brow bar worm screw slot or hole 9c (FIG. 11) on the outside of frame 34 for finger or thumb actuated rotation of worm 6. The adjustment mechanism 36 can have certain similar components and operate in a similar manner as in certain embodiments disclosed in U.S. patent application Ser. No. 14/541,662, filed Nov. 14, 2014, entitled "Spectacle with Invisible Optics", the entire teachings of which are incorporated herein by reference.

The corner shaped housing 2 can include a pupil flex/cable entry channel, hole or opening 2b that has an upright narrow rectangular shape which can receive a flex or ribbon cable 41 (FIG. 4A) from the electronic cable/flex exit 5a of microdisplay 26 into the housing 2. The rearward end of the corner shaped housing 2 can have a hinge element or member 40 (FIG. 4A) to which the right or first side frame portion, stem or temple 10 can be pivotably or rotatably mounted or attached by mating hinge member 42 and screw/nut 15 arrangement through hinge assembly pivot hole 2e along upright axis $T_1$. The hinge member 40 can have rounded sides and a pupil flex exit channel/hinge, channel, hole or opening 2d that is in communication or connects with channel 2b, and extends to the rearward end of hinge member 40. The exit channel 2d can have open top and bottom ends extending through the hinge member 40, and can extend from channel entry channel 2b in a curved or arched concentric path relative to pivot hole 2e on the inner side of pivot hole 2e, before widening into a widened exit opening or notch having a lateral width that extends to or beyond the opposite side of the pivot hole 2e. The transition between entry channel 2b and exit channel 2d can be at a bent angle, and this in combination with the curved portion of the exit channel 2d, can secure or hold wires or cables such as a flex cable 41 from the microdisplay 26 in a stable manner within corner shaped housing 2 and hinge member 40, while a portion of the flex cable 41 extending into right temple 10 through an opening 44 in the forward end can move or fold with movement of hinge member 42 of right temple 10 relative to hinge member 40. The widened rearward end of exit channel 2d can provide the flex cable 41 with room to move side to side which can prevent damage to the flex cable, when the right temple 10 is pivoted, which can be 90°. The assembly cover 8 can also include an electronic cable clearance track 8a which can provide room or a passage for electrical wires or cables which can include electrical wires 43 extending between the right temple 10 and the frame chassis 7. This provides a slim compact and elegant corner structure that not only supports the microdisplay 26, but also allows the passage of wires and/or cables therethrough.

Figure 1A:
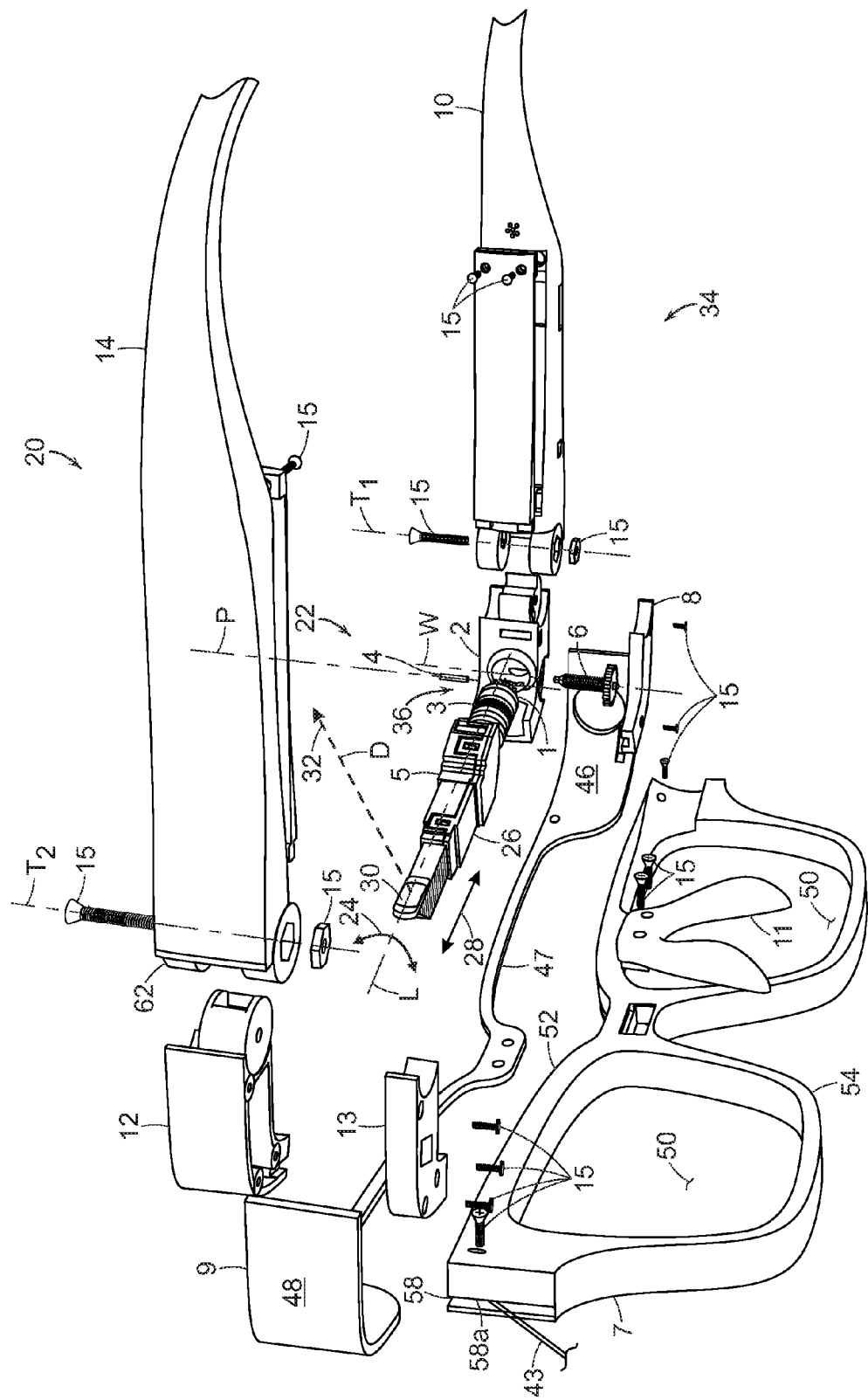
FIG. 1A is an enlargement of FIG. 1 including further annotations.

The frame chassis 7 can be a front eyewear or spectacle frame extending in a generally flat or shallow curved manner holding two lenses 50, (prescription and/or sunglass lenses). The frame chassis 7 can have an upper or top frame or rim portion 52 above the lenses 50 and a lower or bottom frame or rim portion 54 extending around the sides and bottom of the lenses 50 (FIG. 1A). A nose rest or adjustable silicone nose pad 11 can be secured to the frame chassis 7 and frame bracket 9 within a rectangular hole or nose pad clearance pocket 7d by screws 15 through interlocking brow bar registration holes 9a. The upper right eye portion of the frame chassis 7 above the lense 50 can have a recessed portion or motion mechanism clearable track 7c to provide clearance for the adjustable display module 22 and linear or rotational adjustment of the microdisplay 26. The upper rim 52 can have an elongate wiring passage, slot or channel 58 (FIGS. 1A, 2 and 4A) extending downwardly from the top surface into the upper rim 52 and can have a curved contour matching, accounting for, or conforming to curves of the frame chassis 7, laterally and vertically, as well as the shape of the frame bracket 9. The wiring channel 58 can extend through the upper rim 52 the entire lateral length and through the opposing right and left lateral ends, thereby being upwardly and laterally open. The wiring channel 58 can include a lower or bottom wiring passage, slot, cavity or channel portion 58a for containing electrical wires 43 passing through the frame chassis 7 between the right 10 and the left 14 temples.

The frame bracket 9 and front bracket portion 47 can have an upper surface that is curved to match the upper surface or upper rim 52 and can have a narrow thickness that is sized and shaped or curved to match the narrow width and shape or curve of the wiring channel 58 for insertion and securement therein, while being positioned above the lower wiring passage portion 58a and wires contained therein, thereby covering and protecting the wires 43. The frame bracket 9 can act as both a structural bracket and a cosmetic cover over wires 43. This allows passage of wires 43 through the frame chassis 7 in a slim compact elegant design that can look like prescription eyeglasses or sunglasses. The frame bracket 9 includes first or right 46 and second or left 48 corner bracket portions which are bent rearwardly from the front bracket portion 47 to extend from the wiring channel 58 first laterally, then rearwardly. The bottom of the corner bracket portions 46 and 48 extend or curve downwardly to provide a total upright height greater than the height of the front bracket portion 47 that is large enough to mount the first or right corner shaped housing 2 and a second or left corner shaped housing or module 12 thereto, on curved upright inner surfaces. Portions of the corner bracket portions 46 and 48 having a large upright height can be secured within the wiring channel 58 at the ends of the frame chassis 7 by screws 15 through interlocking brow bar registration holes 9a. The securement of the large height portion of the corner bracket portions 46 and 48 within the wiring channel 58 can provide increased strength and rigidity to the corner bracket portions 46 and 48. The right corner bracket portion 46 can have a brow bar motion mechanism hole 9b through which the head of the adjustment screw 1 can extend for access by the user.

The second or left corner shaped housing or module, or power, microphone hinge housing 12 can include a microphone aperture 12a, a hinge member 60 at the rearward end with a hinge assembly pivot hole 12d and a hinge/cable exit channel, opening or hole 12b. The hinge member 60 can be pivotably or rotatably mounted or connected to hinge member 62 of left temple 14 about upright axis $T_2$ with screw/nut 15 through pivot hole 12d. The cable exit channel 12b can provide access or passage for electrical wires 43 from frame chassis 7 to pass through hinge member 60 into left temple 14 via opening, passage or channel 62 in the forward end of left temple 14, while allowing the left temple 14 to pivot, which can be 90°. A power, microphone hinge housing assembly cover 13 can be secured to the bottom of the left corner shaped housing 12, by screws 15 and can include an on/off switch port 13a.

Figure 12:
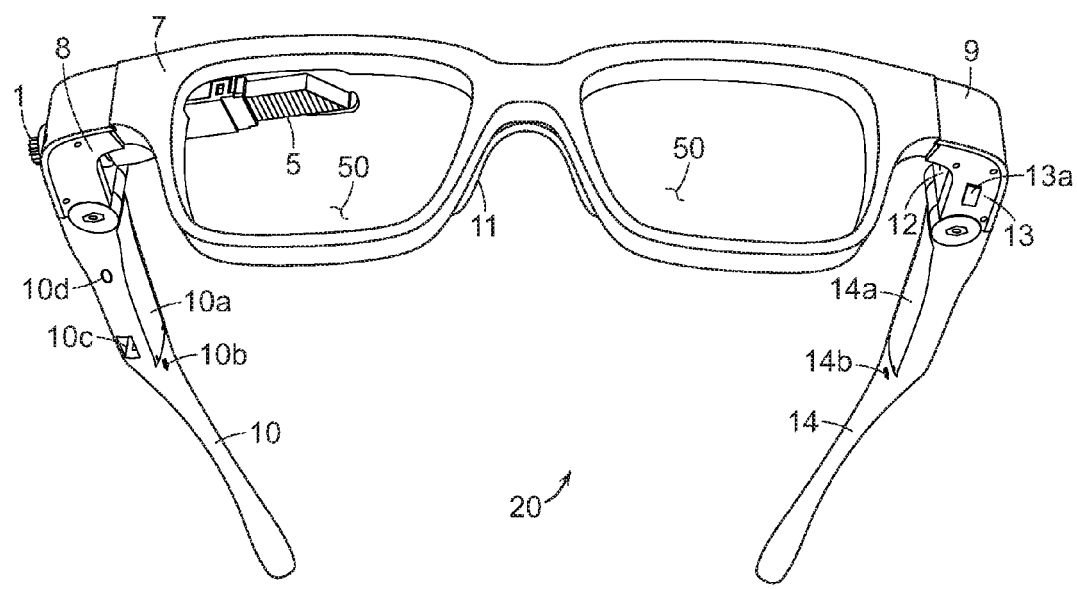
FIG. 12 is a lower front perspective view thereof.

The right 10 and left 14 temples can include right 10a and left 14a temple assembly covers secured with screws 15 for covering cavities within temples 10 and 14 containing various components, and can have right 10b and left 14b temple speakers. The right temple 10 can include a USB port 10c, and a board reset port 10d (FIGS. 11 and 12).

Further description of embodiments in the present invention shown in FIGS. 1-12 follows, which can be described as a computer-integrated eyeglass system with an interpupillary motion mechanism or a computer integrated ophthalmic eyeglass system with multidirectional, interpupillary motion and angle of view positioning. The invention can allow the user to adjust and position a viewable computer screen, which can be integrated in an ophthalmic eyeglass or sunglass frame. The modular fabrication of the frame, and novel hinge design, can allow for seamlessly embedding electronics and ancillary components. The description below can use some different terms and reference numerals than used above. The eyeglass frame can be made up of the following components and subassemblies identified by the adjacent reference numerals as seen in FIGS. 1-12:

Pupil Motion Mechanism and Components
1 Interpupillary Adjustment Screw
2 Motion Mechanism Housing/Sleeve Bearing/Hinge
3 Worm Drive
4 Interpupillary (IPD) Adjustment Limiter Pin
5 Pupil Mechanism
6 Worm Screw
7 Frame Chassis
8 Housing/Hinge Assembly Cover The components numbered 1, 3, 5, 6 can be referred to as the "pupil motion mechanism"; and can be referred to as a single assembly that is housed in the motion mechanism housing/sleeve bearing/hinge 2, and secured via the interpupillary adjustment limiter pin 4, and housing/hinge assembly cover 8 with fasteners.

9 Interlocking Brow Bar
10 Right Temple
11 Adjustable Silicone Nose Pads
12 Power, Microphone, Hinge Housing
13 Power, Microphone, Hinge Housing Assembly Cover
14 Left Temple
15 Assembly Screws/Fasteners Each of these components can contain unique subfeatures as identified by the following reference numerals.

2a IPD Adjustment Limiter Pin Hole
2b Pupil Flex Entry Channel
2c Worm Drive Cavity
2d Pupil Flex Exit Channel/Hinge
2e Hinge Assembly Pivot Hole
2f Worm Screw Registration Track
5a Electronic Cable/Flex Exit
7a Interlocking Brow Bar Channel
7b Interlocking Brow Bar Registration Hole
7c Motion Mechanism Clearance Track
7d Nose Pad Clearance Pocket
8a Electronic Cable Clearance Track
8b Work Screw Registration Track
9a Interlocking Brow Bar Registration Hole
9b Brow Bar Motion Mechanism Hole
9c Brow Bar Worm Screw Hole
10a Right Temple Assembly Cover
10b Right Temple Speaker 10c USB Port
10d Board Reset Port
12a Microphone Aperture
12b Hinge/Cable Exit
12c Electronic Cable Clearance Track
12d Hinge Assembly Pivot Hole
13a On/Off Switch Port
14a Left Temple Assembly Cover
14b Left Temple Speaker Interpupillary Adjustment Screw: The interpupillary adjustment screw 1 (IPD screw) can serve both functional and aesthetic/branding purposes. The IPD adjustment screw 1 (FIG. 11) activates linear motion of the pupil mechanism assembly 5 to accommodate the user's interpupillary distance by means of turning. The IPD screw 1, worm drive 3, and connected components of the pupil mechanism 5 (FIGS. 4 and 4A) can be inserted into the worm drive cavity 2c from the inner temple side and nest tightly into the worm drive cavity of the motion mechanism housing/hinge 2 by means of the IPD adjustment limiter pin 4. Description and figures of this motion mechanism subassembly can be found in U.S. patent application Ser. No. 14/541,662, filed Nov. 14, 2014. The outward face of the IPD screw can also serve as a branding purpose with a rotating company logo. The IPD adjustment screw can be the primary means by which horizontal linear motion is engaged.

Motion Mechanism Housing/Hinge: The motion mechanism housing/hinge 2 (FIGS. 4 and 4A) has multiple functions. One function is to secure and stabilize the pupil motion mechanism 1, 3, 5 and 6 and its travel. Another function is to hide and seamlessly integrate the electronic components, cables, flexes, or wires coming from the pupil mechanism electronic cable/flex exit 5a and interlocking brow bar channel 7a in the frame chassis 7 (FIG. 3) via the pupil flex/cable entry channel 2b. After the wires, flexes, or other electronic cables travel through these channels, they can exit from the pupil flex exit channel/hinge 2d and enter the right temple between the hinge knuckles into the cavity of the right temple. The hinge assembly pivot hole 2e and hinge 2d can provide alignment and 90 degree rotation of the right temple, allowing the electronics to bend 90 degrees with the temple without breakage to the cable. After the worm screw 6 (FIG. 3) is positioned in the motion mechanism housing by the worm screw registration track 2f and housing assembly hinge cover 8 is fastened via assembly screws, the assembled motion mechanism and housing/hinge (FIG. 2) can be adhered or secured to the interlocking brow bar 9 (FIG. 2) as a modular unit.

Worm Drive: The worm drive allows the pupil motion mechanism 5 (FIG. 5) to rotate on a latitudinal axis when engaging with the worm screw 3 and 6 (FIGS. 4 and 4A). The cylindrical worm drive has a groove which allows the drive to align and lock into the motion mechanism housing 2 via the IPD Adjustment Limiter Pin 4. The worm drive also permits longitudinal motion for the pupil mechanism via a square extrusion guide and track. The coupling of the two components forms a solid interlocking bond. This pairing can limit any unwanted rotational movement, thereby allowing for a high precision, high torque solution. By means of a swiping motion, the worm engagement wheel provides latitudinal movement along a fixed coaxial center of the worm drive via the worm and shaft. This swiping motion in turn actuates the pupil mechanism's pivot, allowing the user to easily adjust the pantoscopic angle of view of the display.

IPD Adjustment Limiter Pin: The IPD adjustment limiter pin 4 (FIG. 4) can create a limitation to the longitudinal travel of the pupil motion mechanism, and to lock the worm drive and subassembly into the motion mechanism housing. The IPD adjustment limiter pin prevents any unwanted linear movement.

Pupil Mechanism: The Pupil Mechanism 5 (FIGS. 1 and 1A) houses the optics, electronics, and display. The invention can accommodate both longitudinal and latitudinal movement of this mechanism for customization of the viewer's interpupillary distance and rotational angle of view. The pupil mechanism also may house the cables, flex, or wires which exit from its housing at 5a (FIGS. 4 and 4A) and enter the motion mechanism housing/hinge 2b.

Worm Screw: The worm screw 6 (FIGS. 4 and 4A), can enter the motion mechanism housing 2 (FIG. 5) and align with the worm drive by registration track 2f Clockwise and counterclockwise motion on the worm engagement wheel 6 drives the latitudinal pivoting motion of the pupil mechanism. Once threaded with the worm wheel of the worm drive, the worm screw locks the motion mechanism into place.

Frame Chassis: The frame chassis 7 can be ophthalmically constructed to accommodate prescriptive lenses, adjustable silicone nose pads, interlocking brow bar, and electronic wires and cables. The motion mechanism clearance track 7c (FIG. 3) allows the rotational movement of the pupil motion mechanism to freely accommodate pivoting motion without hitting the frame chassis. An interlocking brow bar channel 7a can be a groove cut along the top of the frame to accommodate both the interlocking brow bar and any electronic wires. The wires\cables are placed into the interlocking brow bar channel before the interlocking brow bar is slid into the groove and then the registration holes 7b and 9a, adjustable nose pads 11, and assembly screws 15 lock the assembly together. Top view as assembled can be seen in FIG. 8.

Housing/Hinge Assembly Cover: The housing/hinge assembly cover 8 can include an electronic cable clearance track 8a (FIGS. 4 and 4A), a worm screw registration track 8b, and pilot holes for assembly. It provides a locking rest against downward travel to the worm screw 6. Any wires or cables exiting from between the interlocking brow bar 9 (FIG. 5) and interlocking brow bar channel of the frame chassis can be placed through the electronic cable clearance track 8a and into the cable entry channel 2b before exiting the hinge 2d.

Interlocking Brow Bar: The interlocking brow bar 9 can be a modular component of the frame construction (FIG. 3) which provides rigidity and form to the frame chassis, an anchor point for the adjustable nose pads via the threaded registration holes 9a, and concealment to the electronic cables and wires. The brow bar motion mechanism hole 9b and brow bar worm screw hole 9c can provide support to the motion mechanism housing and worm screw. These apertures enable the user to easily engage both latitudinal and longitudinal movement of the pupil motion mechanism (FIG. 11).

Figure 5:
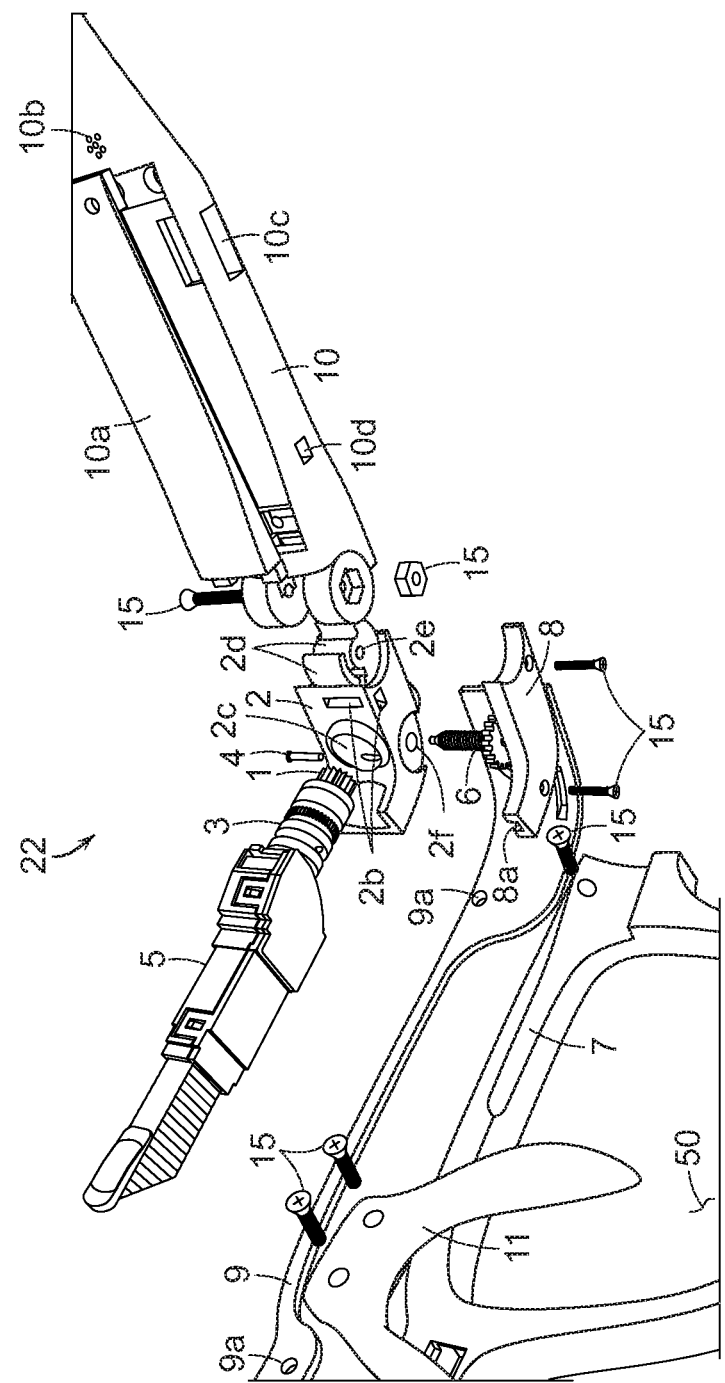
FIG. 5 is an exploded lower perspective view of the right hand corner thereof.
Figure 6:
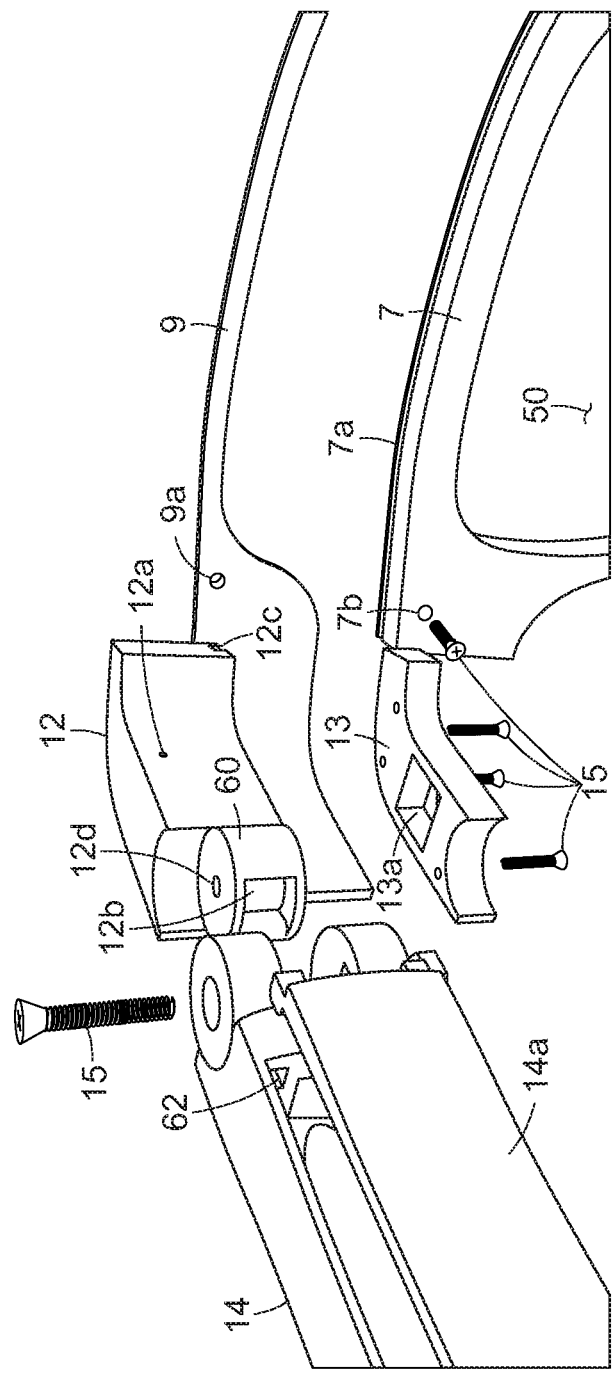
FIG. 6 is an exploded upper perspective view of the left hand corner thereof.
Figure 7:
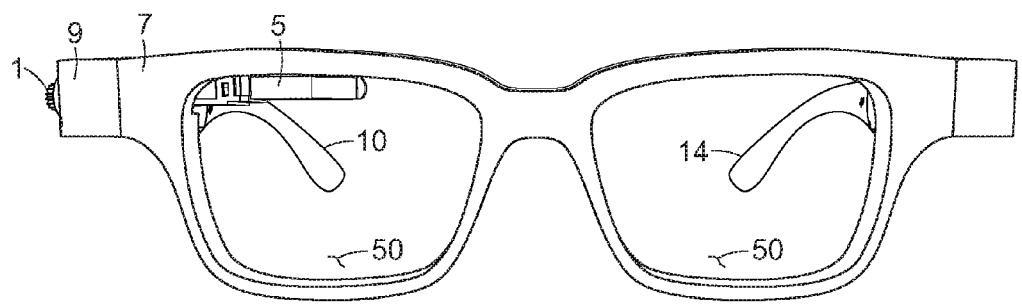
FIG. 7 is a front view of the assembled embodiment of FIG. 1.
Figure 8:
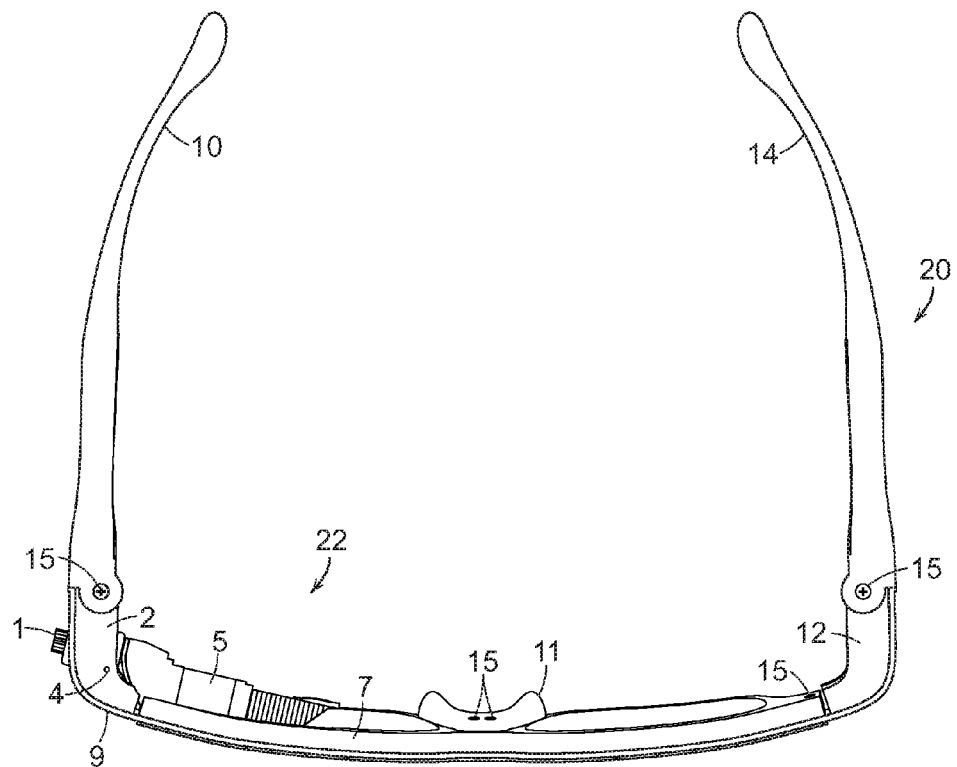
FIG. 8 is a top view thereof.
Figure 9:
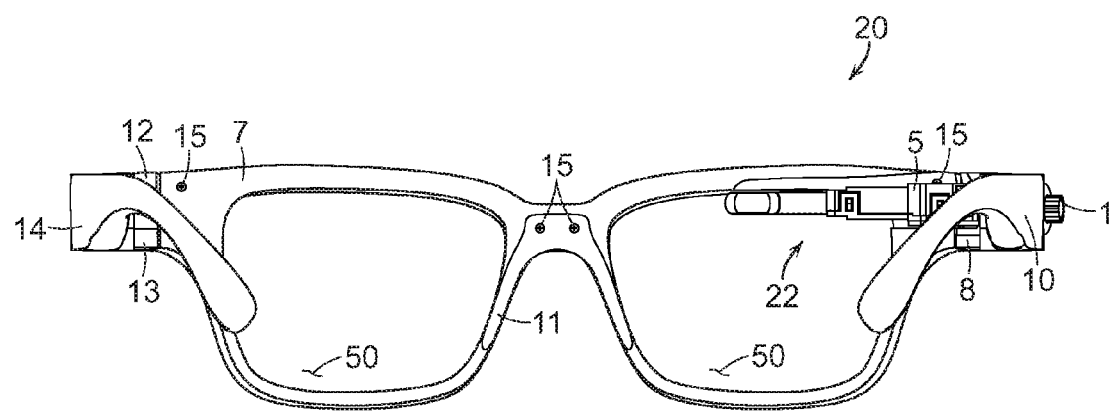
FIG. 9 is a rear view thereof.
Figure 10:
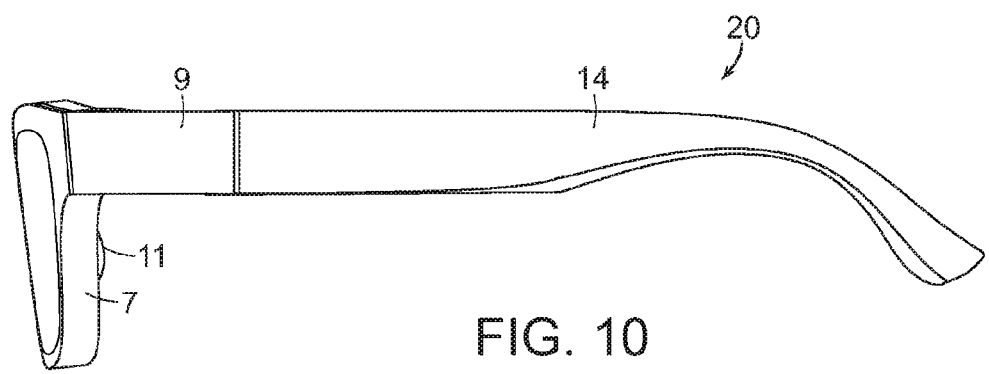
FIG. 10 is a left side view thereof.

Right Temple: The right temple 10 can accommodate the electronic board, cables, USB port 10c, board reset port 10d and speakers 10b of the eyeglass frame (FIG. 5). When positioned in the open direction of wearing, the temple engages with the motion mechanism housing/hinge 2d (FIGS. 4 and 4A) and allows any cables, flexes, or wires to pass into the temple cavity by the opening between the knuckles of the temple. The assembly cover 10a is positioned and screwed into place for a flush, closed concealment of electronics.

Adjustable Silicone Nose Pads: The adjustable silicone nose pads 11 protrude into the nosepad clearance pocket 7d (FIG. 3) of the frame chassis, and are fastened by assembly screws to the interlocking brow bar via the threaded registration holes 9a. This allows customized fitting for a range of nose bridge types.

Power, Microphone, Hinge Housing 12: The hinge housing on the left side of the frame can accommodate the microphone 12a, and On/POff switch to the battery (FIG. 3). The electronic cable clearance track 12c (FIG. 6) can conceal the electronics and cables coming from between the interlocking brow bar channel 7a in the frame chassis and interlocking brow bar 9. Similar to the right side of the frame, the electronics can be positioned through the cavity exit of the hinge 12b and into the temple. The hinge housing can be assembled and fastened to the assembly cover 13, and adhered or secured to the interlocking brow bar 9.

Power, Microphone, Hinge Housing Assembly Cover 13: The On/Off Switch Port 13a (FIG. 6) can be housed in the assembly cover 13 for easy access to powering the battery. This cover is fastened via assembly screws 15 to the hinge housing and adhered or secured to the interlocking brow bar 9. Any cables, flexes, or wires coming from the battery or electronic board can travel between the housing and assembly cover.

The Left Temple 14 can accommodate the battery, speaker and cables/wires traveling to and from the hinge/cable exit 12b (FIG. 6) of the power, microphone, hinge housing 12b. Like the right temple, the left temple can be hollowed out between the knuckles to seamlessly conceal any ancillary electronic wires and cables (FIG. 3) and integrate with the hinge portion of the hinge housing, allowing the temples to close without damaging the flexes, wires, or cables.

Figure 17:
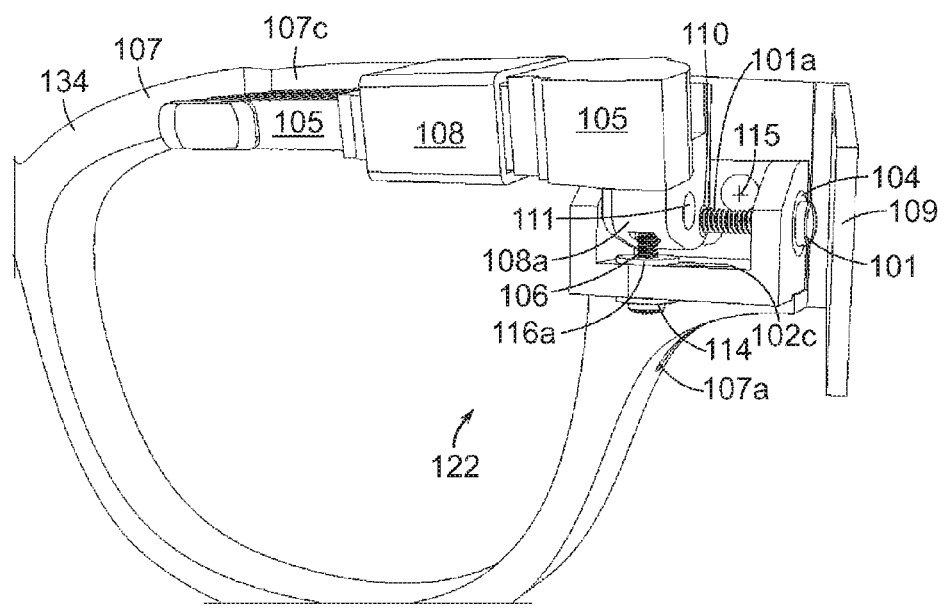
FIG. 17 is a rear perspective view of the embodiment of FIG. 16.
Figure 17A:
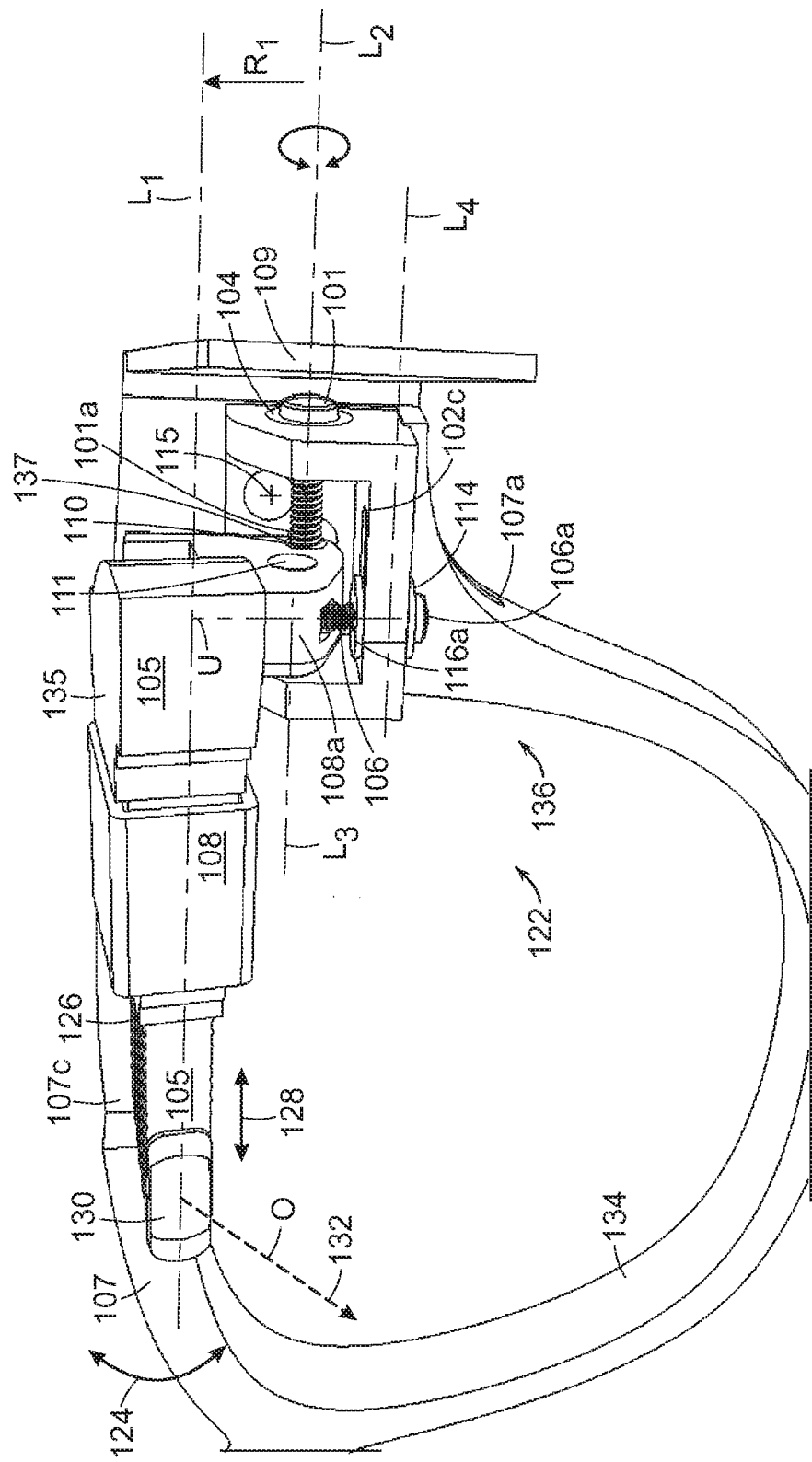
FIG. 17A is an enlargement of FIG. 17 with additional annotation.
Figure 18A:
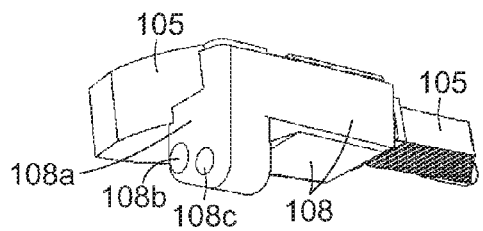
FIGS. 18A, 18B and 18C show various perspective views of embodiments of a display module in the present invention.
Figure 18C:
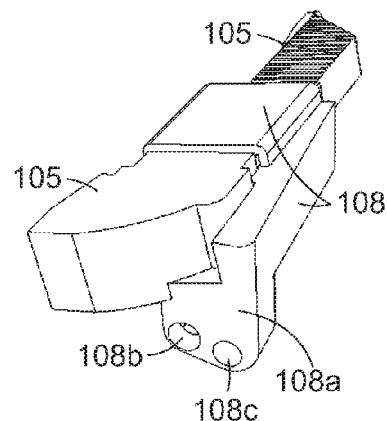
Figure 18B:
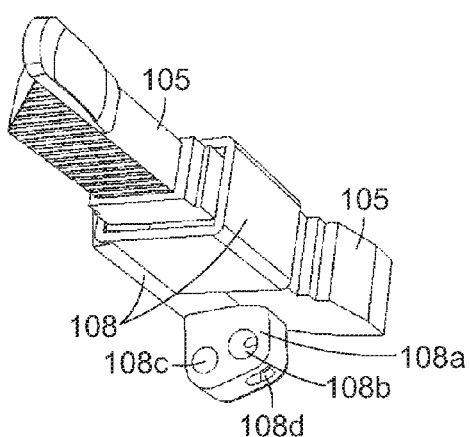

Referring to FIGS. 13-19A, in other embodiments of the present invention, an electronic eyewear viewing system or device 120 (FIG. 17A) can be a computer integrated eyeglass system including an adjustable display assembly 122 (FIG. 13A) having a display module 135 with an active matrix display or microdisplay 126, and an adjustment mechanism 136 mounted to an eyewear, spectacle or eyeglass frame 134. The eyewear frame 134 can generally include a front eyewear frame portion or frame chassis 107, and a frame bracket or interlocking brow bar 109, which can be connected to first or right, and second or left, side frame portions, stems or temples. The microdisplay 126 can be electronically, processor or computer-driven, and can display images 132 including text and/or video on a small display screen or image exit window 130 along the optical axis O. The adjustment mechanism 136 of the adjustable display assembly 122 can adjust the position of the image exit window 130 and optical axis O of display module 135 incrementally laterally in a linear direction along a first lateral axis $L_1$ in the direction of arrows 128, while incrementally adjusting the linear position of the display module 135 along a second lateral axis $L_2$. The second lateral axis $L_2$ can be parallel to and spaced apart from to the side and below the first lateral axis $L_1$. The adjustment mechanism 136 can also incrementally pivotably or rotatably adjust the position of the image exit window 130, optical axis O and display module 135 about or around a pivot joint 137 along the second lateral axis $L_2$, in the direction of arrows 124, to angle or tilt image exit window 130 and optical axis O to the user's eye, such as slightly angled or tilted downwardly. The exit window 130 can move concentrically about, in front of and above the second lateral axis $L_2$ along a circular or curved path having a radius of $R_1$, which is the distance between the axes $L_1$ and $L_2$. The adjustable display assembly 122 can be mechanically adjustable.

The adjustable display assembly 122 can include the display module 135, microdisplay 126 and an adjustment mechanism 136, mounted to a first or right corner of the eyewear frame 134, and can be mounted to the brow bar 109. The display module 135 can include a housing or pupil mechanism support harness 108 containing the microdisplay 126, and a support harness base or tongue like protrusion 108a that can extend downwardly relative to the microdisplay 126. The support harness base 108a can include pivot joint 137 extending therethrough along the second lateral axis $L_2$, which can include a threaded hole 110a. The pivot joint 137 can include a lateral hole, opening, bore, or interpupillary distance (IPD) sleeve track 108c extending laterally through support harness base 108a along the second lateral axis $L_2$ for receiving a threaded nut or IPD threaded travel sleeve 110 having the threaded hole or travel sleeve threads 110a. The sleeve 110 can be secured, trapped or adhered within track 108c. A lateral motion or interpupillary distance adjustment (IPD) screw 101 can extend through the support harness base 108a along the second lateral axis $L_2$ and engage threads 110a. The display module 135 can be linearly moved laterally along the axis $L_2$ by IPD screw 101 for IPD adjustment of the exit window 130 along axis $L_1$ relative to the user's eye.

The support harness base 108a can also include an upright angle of view entry hole, opening or cavity 108d offset from the second lateral axis $L_2$, extending upwardly from the bottom into or through a lateral hole, opening, bore or angle of view tilt drum track 108b extending laterally through the support harness base 108a along the third lateral axis $L_3$ that is parallel to and spaced apart from the axis $L_2$ by a distance or radius $R_2$. An angle of view adjustment screw 106 can extend upwardly into entry hole 108d along an upright or generally vertical axis U for engaging mating tilt drum threads 111a for raising and lowering display module 135, by rotating the display module 135 about pivot joint 137, IPD screw 101 and axis $L_2$. The adjustment screw 106 and axis U can intersect with axis $L_3$ at a distance $R_2$ from axis $L_2$. The tilt drum track 108b can receive a generally round or cylindrical angle of view tilt drum or member 111 that is rotatably mounted therein. The angle of view tilt drum 111 can have threads 111a that generally extend upright perpendicular or at a right angle to axis $L_3$ for engaging adjustment screw 106. Tilt drum 111 can rotate about axis $L_3$ to rotate threads 111a about axis $L_3$ to allow operation of the adjustment screw 106 while the tilt drum 111 and threads 111a also move concentrically about pivot joint 137 and axis $L_2$ in a radius $R_2$. The entry hole 108d can have sufficient room for any longitudinal or side to side lateral movement of adjustment screw 106. The radius $R_2$ can be sized to provide in conjunction with the threads per inch of adjustment screw 106, the desired amount of rotational movement of display module 135 per revolution of adjustment screw 106. Adjusting or moving the exit window 130 in a curved path about axis $L_2$ with a radius $R_1$, can provide movement in a curved path with a larger radius and with a more gradual tilt adjustment than if tilted about axis $L_1$ (or alternatively if the exit window 130 was positioned on axis $L_2$) and can in some embodiments make it easier to adjust or obtain the amount of tilt desired by the user.

The display module 135, IPD screw 101 and angle of view adjustment screw 106 can be mounted to a motion mechanism display housing bracket 102. The bracket 102 can have a bottom wall, a rear wall and opposite side or end walls with the cavity within. The IPD screw 101 can be rotatably mounted along axis $L_2$ between the two end walls and extend through support harness base 108a therebetween.

The IPD screw 101 can be rotationally supported by sleeve bearings 104 and 112 positioned within respective sleeve bearing mounting holes, cavities or recesses 102a and 102b, located in opposite end walls. An internal threaded journal 103 with internal threads 103a can be fitted over IPD screw 101 and engaged within hole 104b of sleeve bearing 104 for providing concentric rotation. Alternatively, IPD screw 101 can be provided with a shoulder for engaging sleeve bearing 104. The end of the IPD screw 101 can have an IPD screw journal 101b for engaging the hole 112a of sleeve bearing 112, and a lock washer 113 can be used to trap or lock IPD screw 101 laterally in place.

The angle of view adjustment screw 106 can be extended upwardly through an elongate or linear tilt guide track or slot 102c in the bottom wall and into the support harness base 108a. The track 102c extends through the bottom wall of bracket 102 along a fourth lateral axis $L_4$ that is parallel to and spaced below the third lateral axis $L_3$. The adjustment screw 106 can be secured to a washer 114 below the bracket 102 and a flanged bushing with internal threading 116 that travels within track 102c. Bushing 116 can have a flange 116a which extends above track 102c and with washer 114, can trap the track 102c therebetween. The track 102c allows the adjustment screw 106 to laterally or linearly travel within the display module 135 as it moves within bracket 102. The amount of linear or lateral travel of the display module 135 can be limited by one or all of the length of the IPD screw 101, the space between the end walls of the bracket 102, the width of the support harness base 108a, the length of the track 102c, and the size of the bushing 116. The adjustment screw 106 and bushing 116 can be dimensioned to provide some tilting within track 102c to follow the position of the tilt drum 111 as it moves around axis $L_2$ while rotating about axis $L_3$. The upper surfaces of the end walls of bracket 102 can have a curve, radius or fulcrum 102e which can provide a concentric brace about axis $L_2$ over which the bottom of the display module 135 can rest and be supported during rotation.

The bracket 102 can be mounted to the interlocking brow bar 109 and the eyewear frame 134 by screws 115. In some embodiments, the adjustable display assembly 122 can be a modular unit that is attached to eyewear frame 134, and can in some embodiments include brow bar 109. The brow bar 109 can have ends that are bent rearwardly for securement to side stems or temples. An IPD screw axis hole 109b can be formed in one rearwardly bent end of brow bar 109 for providing access to IPD screw 101 for adjustment.

Additional description of embodiments in the present invention shown in FIGS. 13-19A now follows, which can be described as an adjustable, multidirectional mechanism for accommodating (IPD) interpupillary distance and angle of view for a computer-based eyewear system. The invention can allow the user to adjust a viewable screen along an "x" axis both linearly and rotationally. The description below can use some different terms and reference numerals than used above. The multidirectional mechanism can be integrated into a frame chassis from an assembly of the following components:

101 Interpupillary Adjustment Screw (IPD Screw)
    102 Motion Mechanism Housing Bracket
    103 Internal Threaded Journal
    104 Sleeve Bearing
    105 Pupil Mechanism
    106 Angle of View Adjustment Screw
    107 Frame Chassis
    108 Pupil Mechanism Support Harness
    109 Interlocking Brow Bar
    110 IPD Threaded Travel Sleeve
    111 Angle of View Tilt Drum
    112 Sleeve Bearing
    113 Lock Washer
    114 Washer
    115 Assembly Screws
    116 Flanged Busing with Internal Threading
    101a IPD Screw Travel Threads
    101b IPD Screw Journal
    102a Sleeve Bearing Mounting Hole
    102b Sleeve Bearing Mounting Hole
    102c Tilt Guide Track
    102d Assembly Screw Support Holes
    103a Journal Threads
    104a Sleeve Bearing Flange
    104b Sleeve Bearing Hole
    106a Angle of View Adjustment Screw Head
    107a Interlocking Brown Bar Channel
    107b Frame Chassis Bracket Holes
    107c Motion Mechanism Clearance Track
    108a Support Harness Base
    108b Angle of View Tilt Drum Track
    108c IPD Sleeve Track
    108d Angle of View Entry Hole
    109a Brow Bar Bracket Holes
    109b IPD Screw Access Hole
    110a Travel Sleeve
    111a Tile Drum Threads
    112a Sleeve Bearing Hole
    112b Sleeve Bearing Flange
    113a Journal Clearance Hole
    114a Adjustment Screw Clearance Hole
    116a Bushing Flange Interpupillary Adjustment Screw (IPD Screw) 101: When turned either clockwise or counterclockwise, the interpupillary adjustment screw (IPD screw) 101 (FIGS. 13 and 13A) can activate linear motion of the pupil mechanism 105 to accommodate the user's interpupillary distance. The IPD screw 101 can consist of the screw head, the IPD screw travel threads 101a, and the IPD screw journal 101b. The IPD screw 101, internal threaded journal 103, and sleeve bearing 104 can be coupled together before they are inserted into the sleeve bearing mounting hole 102a. After the IPD threaded travel sleeve 110 is inserted into the IPD sleeve track 108c of the support harness base 108a, the IPD screw journal 101b can be fit firmly into the sleeve bearing hole 112a of the sleeve bearing 112. The lock washer 113 can be fit securely and fused into place against the IPD screw journal 101b, allowing the IPD screw 101 to rotate freely without backing out. The IPD adjustment screw 101 can be the primary means by which horizontal linear motion is engaged.

Motion Mechanism Housing Bracket: The motion mechanism housing bracket 102 (FIGS. 13 and 13A) can have two sleeve bearing mounting holes 102a and 102b, a tilt guide track 102c, and assembly screw support holes 102d. The housing bracket can be mounted onto the interlocking brow bar 109 via assembly screws 115 and aligned with the brow bar bracket holes 109a for secure fastening. The width of the support harness base 108a (FIGS. 17 and 17A), and tilt guide track 102c can determine the distance and travel of the pupil mechanism 105. The tilt support fulcrum 102e (FIG. 15) can provide a concentric brace for angle of view rotation.

Internal Threaded Journal: The internal threaded journal 103 (FIGS. 13 and 13A) can screw onto the IPD adjustment screw 101 via the travel threads 101a and 103a and rest against the IPD screw 101 head. The journal allows the IPD screw 101 to rotate concentrically and with limited friction across the housing bracket via the sleeve bearings 104. The outer diameter of the internal threaded journal 103 can nest into the sleeve bearing hole 104*b* providing a seamless, concentric fit.

Sleeve Bearing: The sleeve bearing 104 (FIGS. 13 and 13A) can function as a means to prevent the support harness 108 and base 108*a* from becoming immovable when contacting the inner face of the housing bracket, and for creating a concentric location for linear travel to be located. The sleeve bearing 104 has a flange 104*a* and inner hole 104*b*, and is mounted into the sleeve bearing mounting hole 102*a*.

Figure 19:
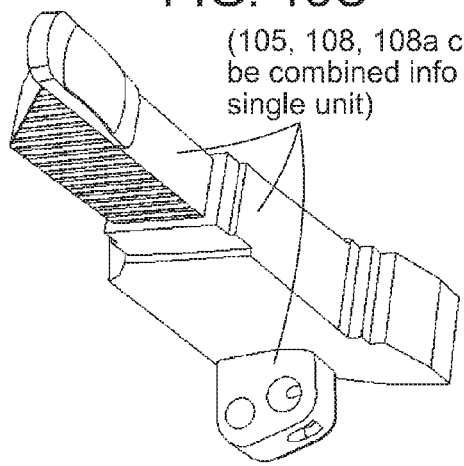
FIG. 19 is a lower perspective view of an embodiment of a display module in the present invention.
Figure 19A:
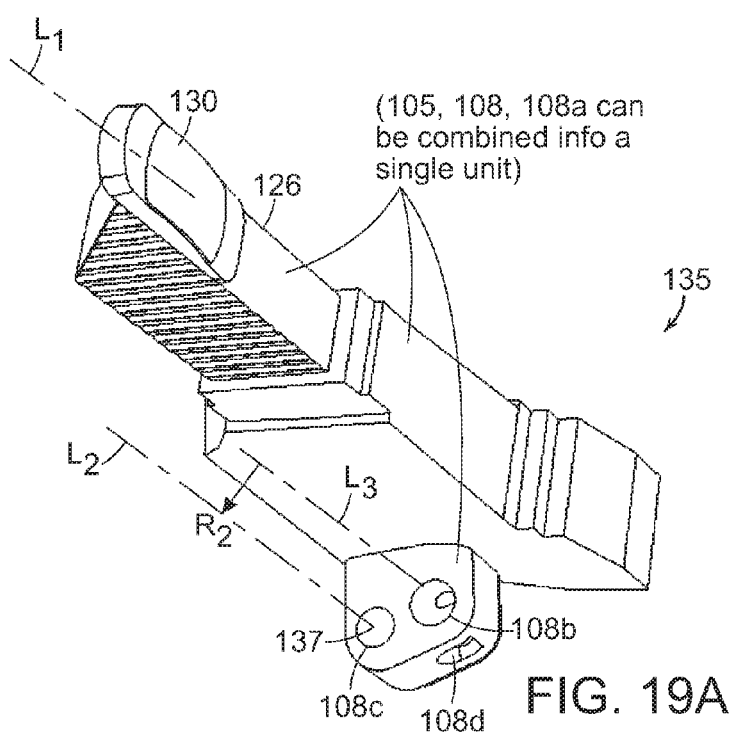
FIG. 19A is an enlargement of FIG. 19 with additional annotation.
Figure 20:
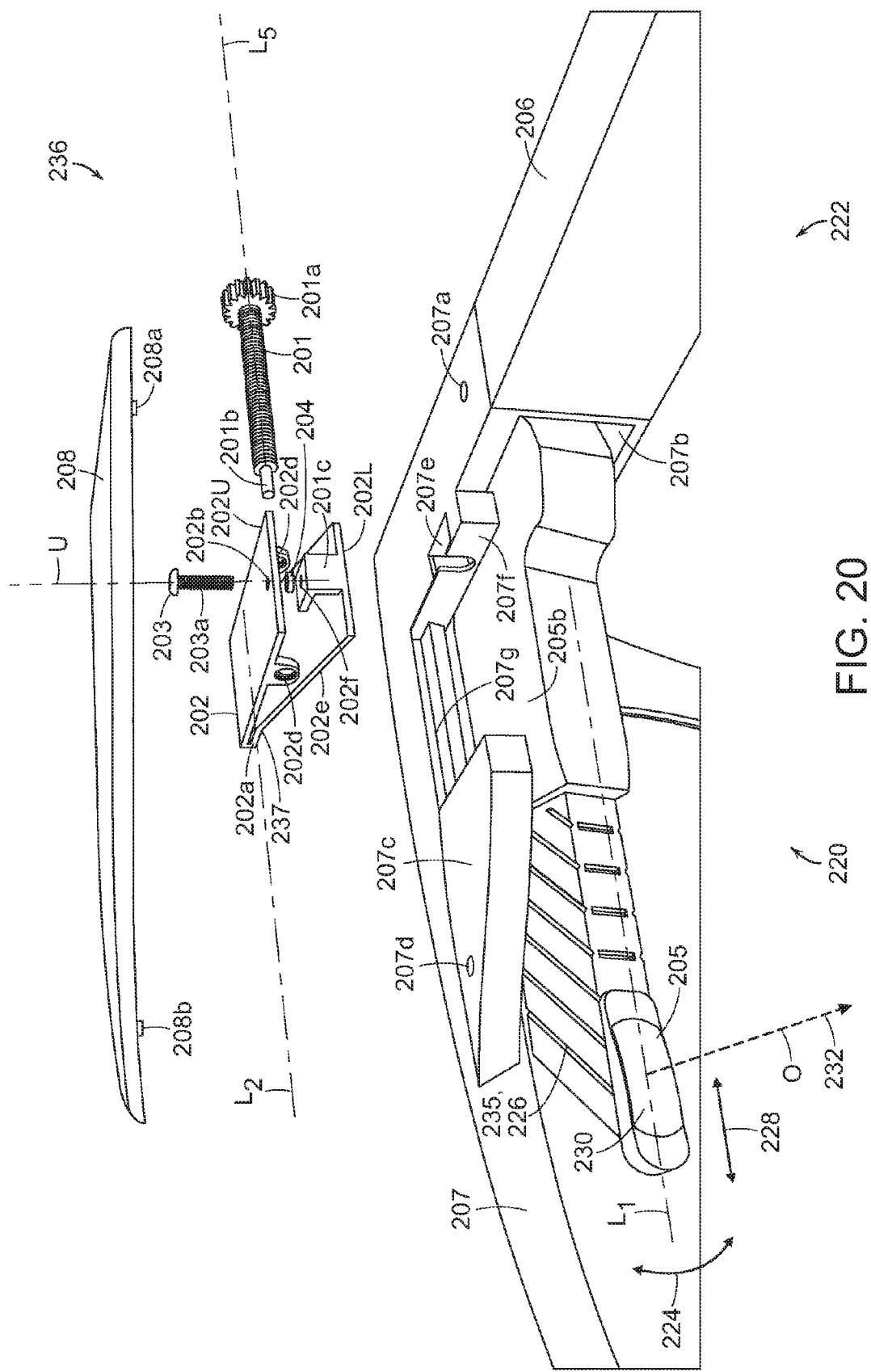
FIGS. 20-22 are perspective exploded views from various angles of a portion of another embodiment of an electronic eyewear viewing device having an adjustable display assembly in the present invention.
Figure 21:
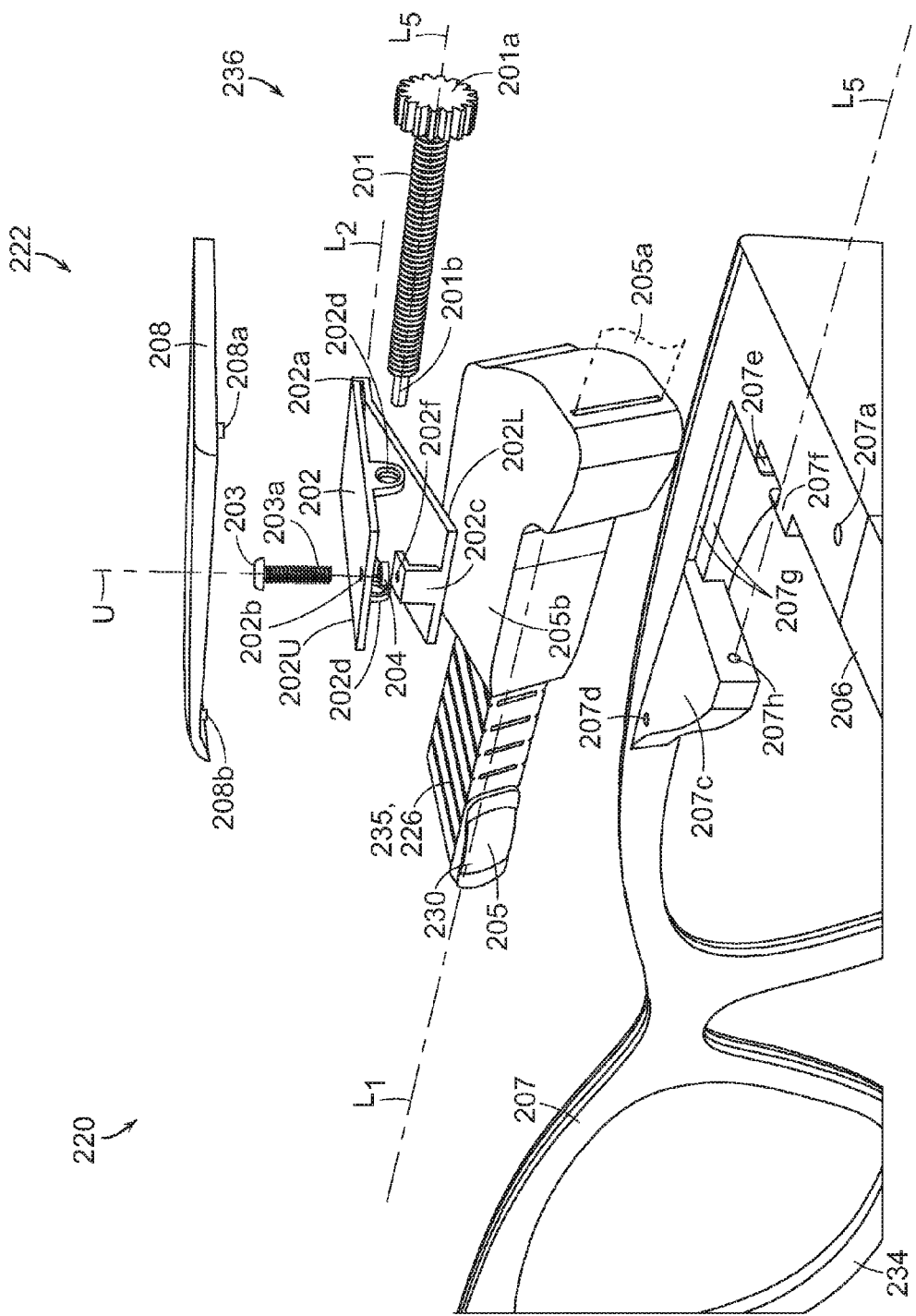
Figure 22:
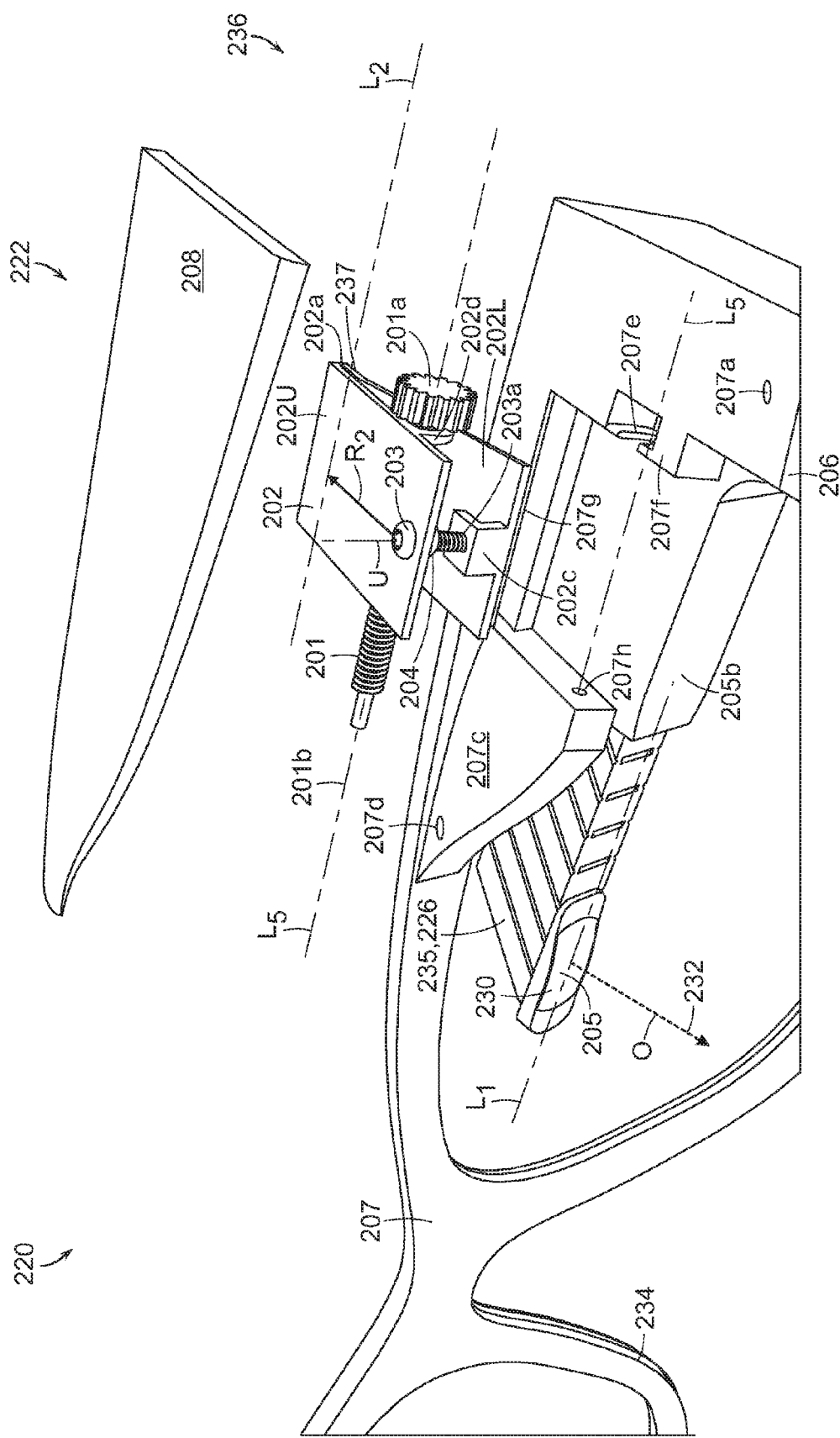
Figure 23:
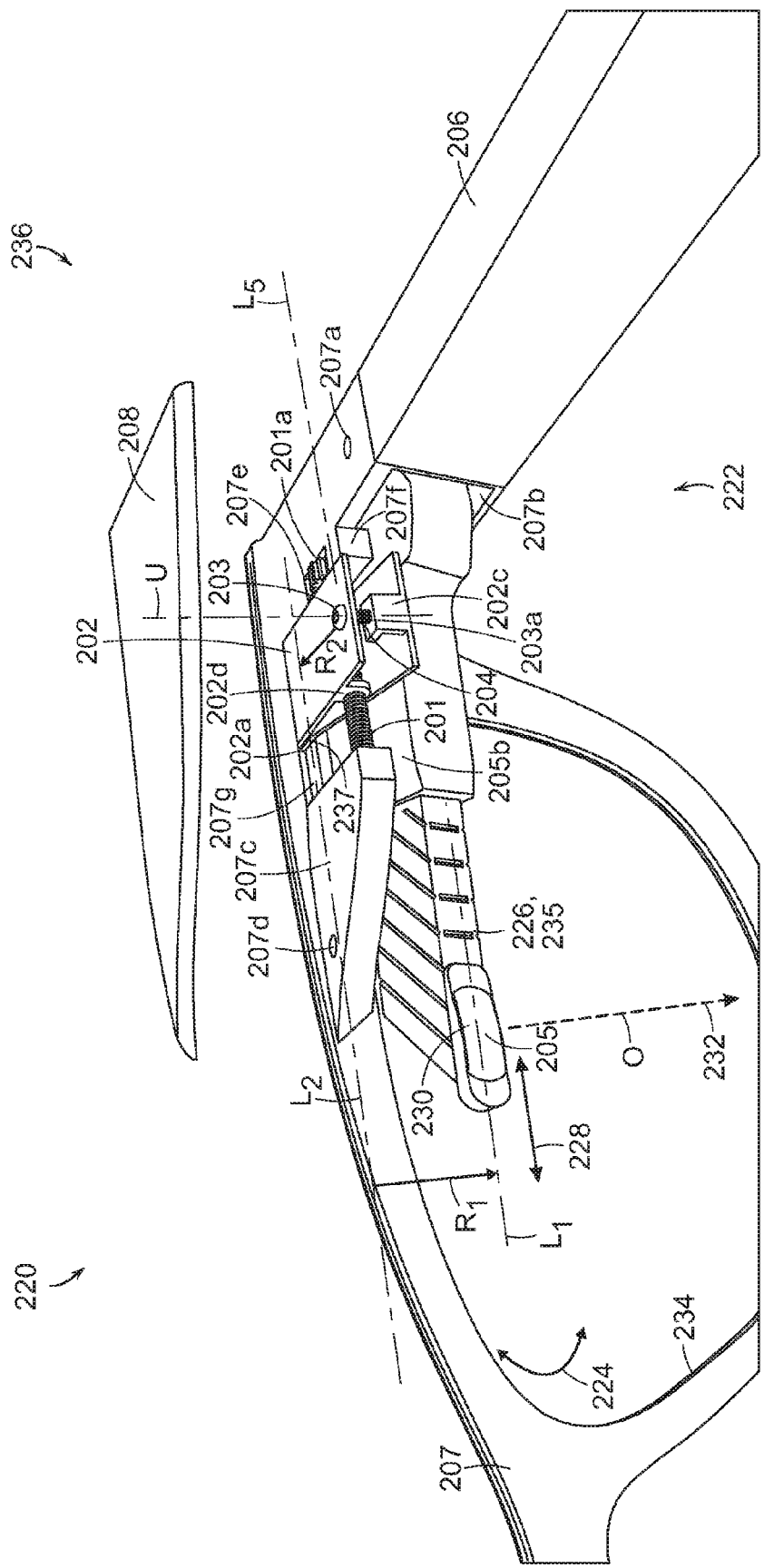
FIG. 23 is a perspective view of the electronic eyewear viewing device of FIGS. 20-22, with a cover member shown in a lifted position.
Figure 24:
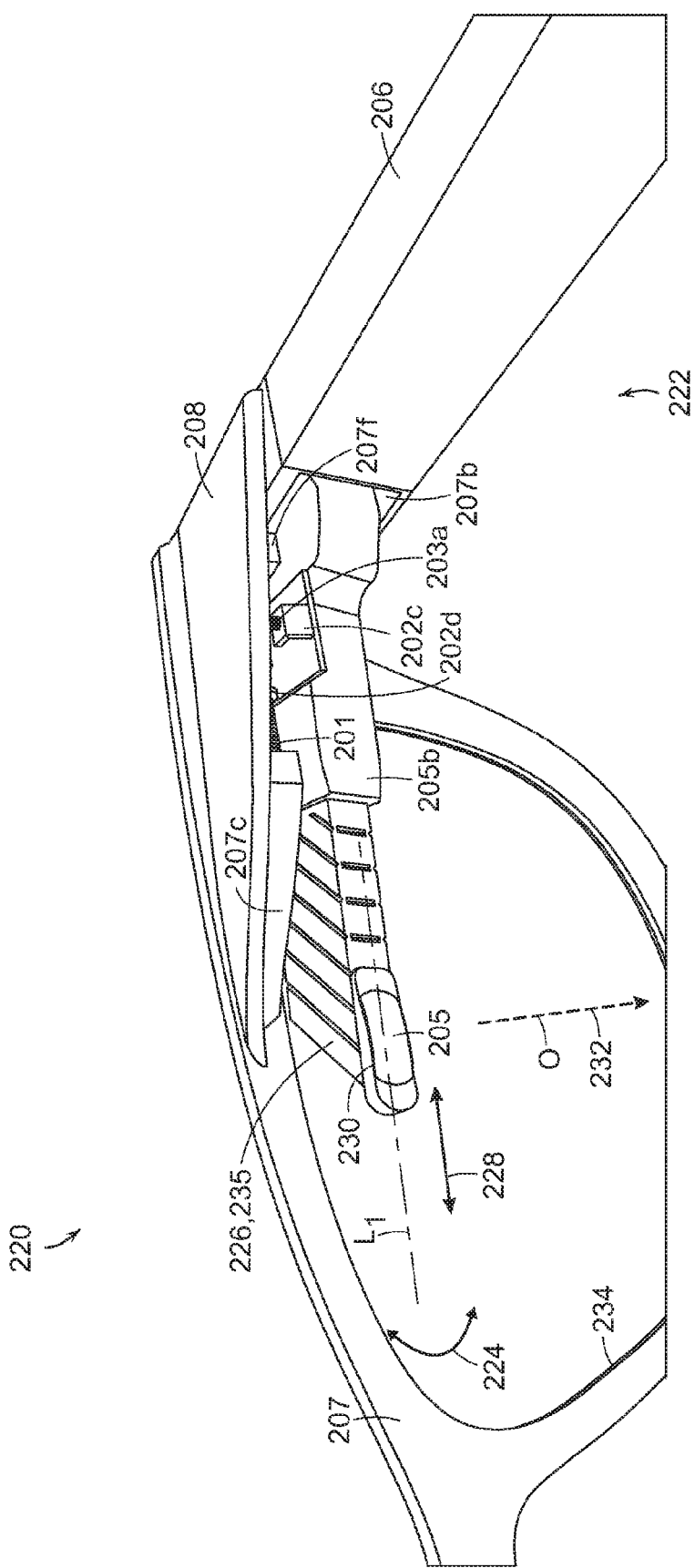
FIG. 24 is a perspective view of the electronic eyewear viewing device shown in FIG. 23 with the cover member in the assembled position.

Pupil Mechanism: The pupil mechanism 105 (FIG. 16) can house the optics, electronics, and display. The invention can accommodate both longitudinal and latitudinal movement of this mechanism for customization of the viewer's interpupillary distance and rotational angle of view. The assembly of the pupil mechanism 105 can either be slid into the support harness 108 (FIGS. 18A-18C), or the pupil mechanism and harness can be formed or cast into a single unit (FIGS. 19 and 19A).

Angle of View Adjustment Screw: The angle of view adjustment screw 106 (FIGS. 13 and 13A) can align vertically through a washer 114, thread through a flanged bushing 116, and continue upward through the angle of view entry hole 108*d* and into the tilt drum 111. When assembled and turned clockwise or counterclockwise, the angle of view adjustment screw 106 allows the pupil mechanism 105 and support harness 108 to rotate up or downward to customize the angle of view for each wearer. The angle of view adjustment screw 106 can be fused to the flanged bushing 116 and washer 114, which secures the screw from dropping out.

Frame Chassis: The frame chassis 107 (FIG. 14) can be ophthalmically constructed to accommodate prescription lenses and sun lenses. The interlocking brow bar channel 107*a* and motion mechanism clearance track 107*c* (FIG. 15) can allow for modular integration of the pupil motion mechanism and ancillary components. The frame chassis bracket holes 107*b* (FIG. 15) provide an access point for the interlocking brow bar and motion mechanism housing bracket to lock together via the assembly screws 115.

Pupil Mechanism Support Harness: The pupil mechanism support harness 108 (FIGS. 17 and 17A) can stabilize the pupil mechanism against unwanted movement. The support harness base 108*a* (FIGS. 18A-18C) can house the angle of view tilt drum 111 (FIGS. 13 and 13A), and the IPD threaded travel sleeve 110. A rigid backplate with sliding track and support base 108*a* secure the pupil mechanism 105. In the final assembly, the support harness and pupil mechanism can be combined into a single unit (FIGS. 19 and 19A).

Interlocking Brow Bar: The interlocking brow bar 109 (FIGS. 13 and 13A) can be a modular component of the frame construction which provides rigidity and form to the frame chassis 107, an anchor point for adjustable nose pads, and concealment to the electronic cables and wires. The brow bar bracket holes 109*a* can provide support to the motion mechanism housing bracket and ancillary components. The IPD screw 101 head can be accessible via the IPD screw access hole 109*b* of the interlocking brow bar 109.

IPD Threaded Travel Sleeve: The IPD threaded travel sleeve 110 (FIGS. 13 and 13A) can be inserted and adhered to the IPD sleeve track 108*c* of the support harness base 108*a*, resulting in a stable threaded structure for the IPD screw to engage with. Linear travel for accommodating interpupillary distance can be achieved with engagement between the IPD screw travel threads 101*a* and the travel sleeve 110.

Figure 13:
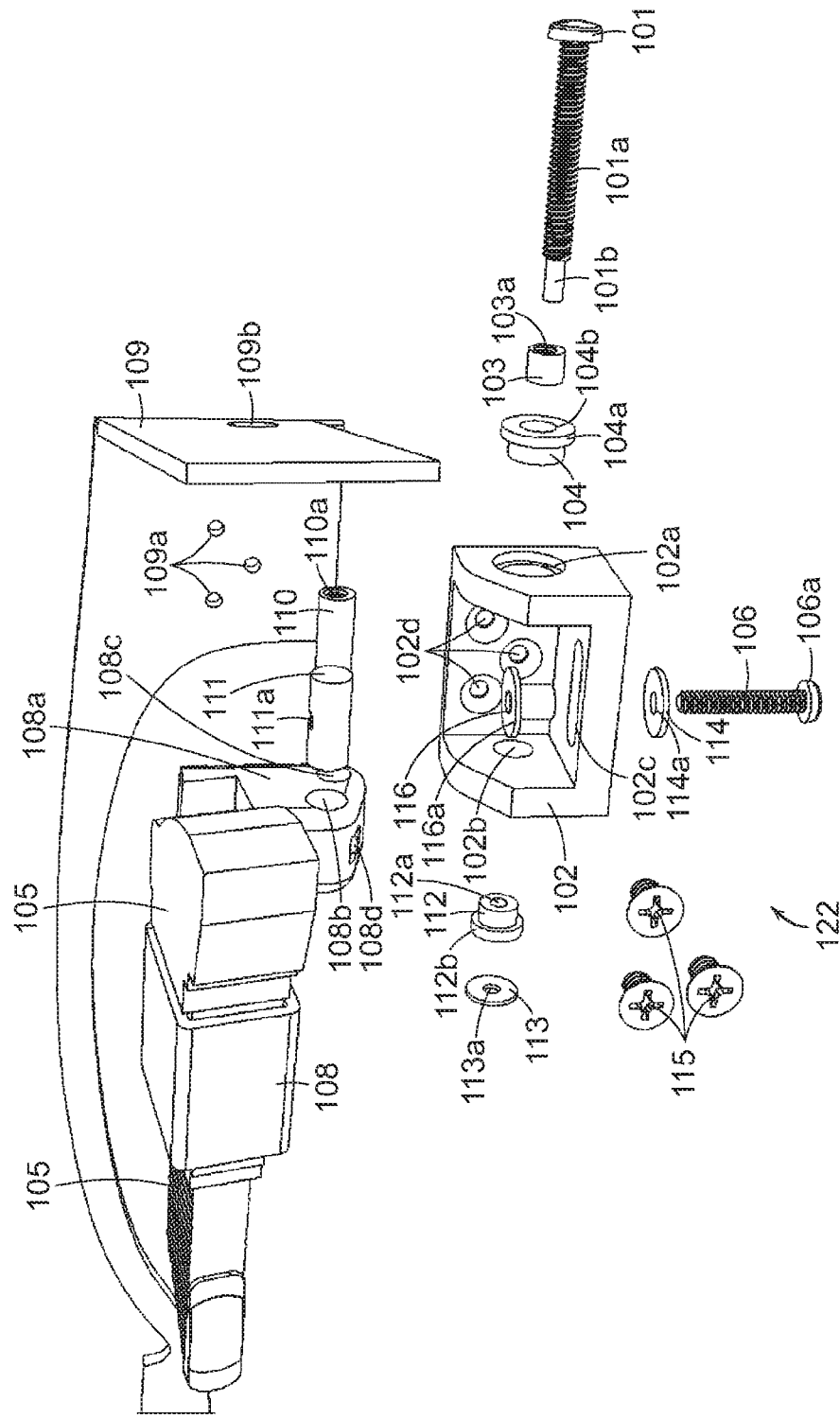
FIG. 13 is an exploded perspective view of another embodiment of a display module and adjustment mechanism forming an adjustable display assembly in the present invention.
Figure 14:
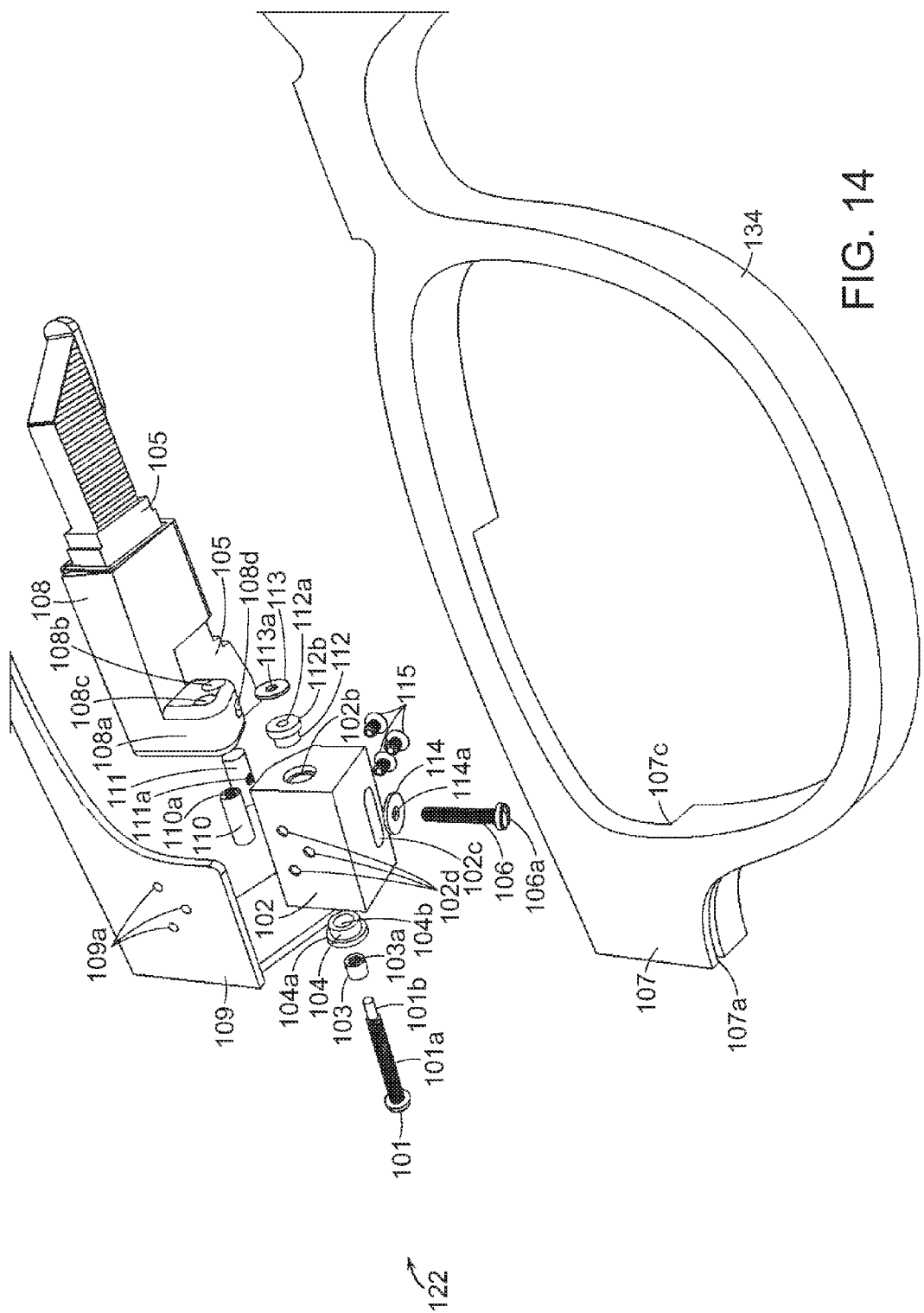
FIG. 14 is an exploded perspective view of an embodiment of a portion of an eyewear frame of an electronic eyewear display, display module and adjustment mechanism from a lower front angle of the eyewear frame.
Figure 15:
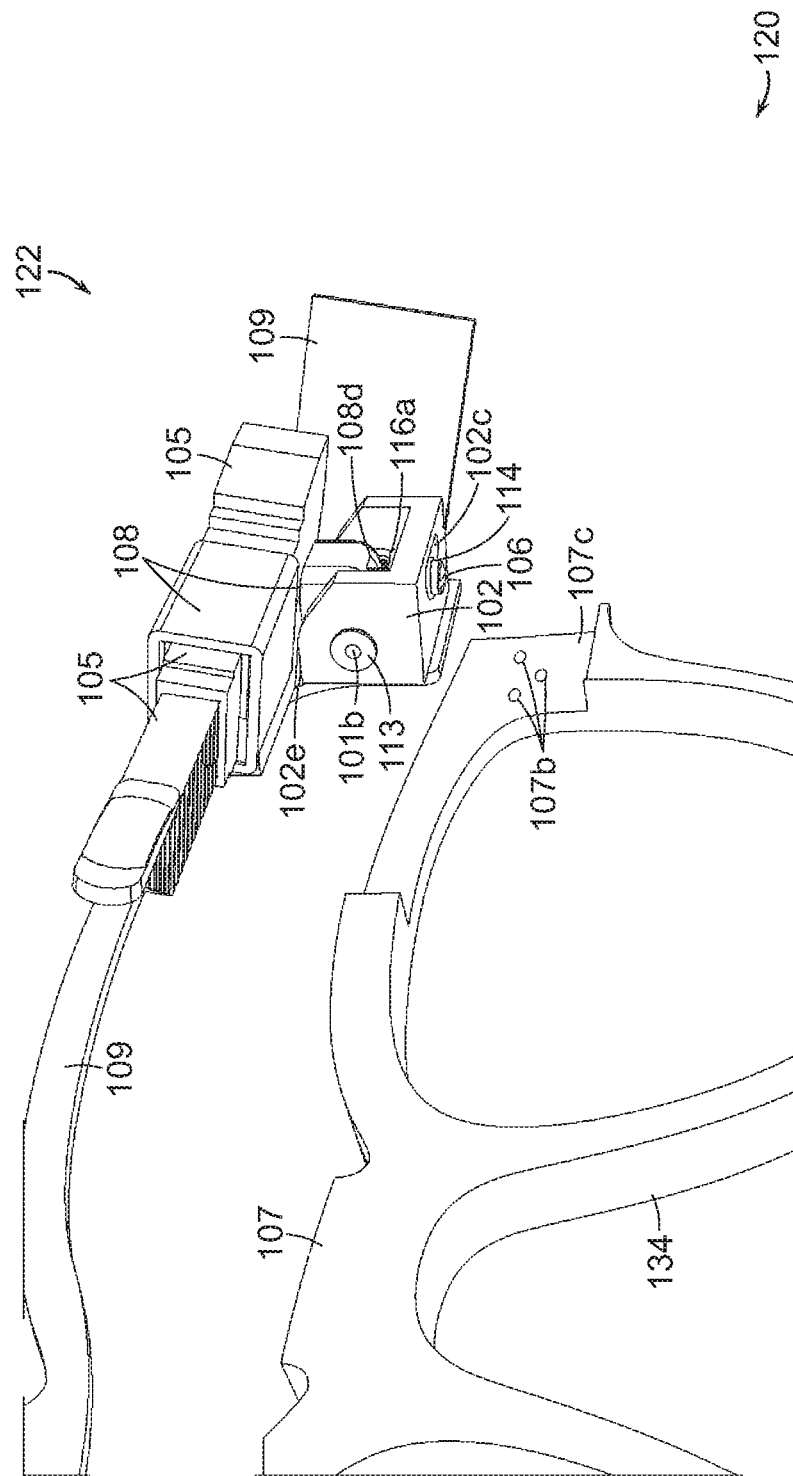
FIG. 15 is an exploded perspective view of a portion of an eyewear frame from a lower rear angle, with a display module and an adjustment mechanism mounted to a brow bar bracket.
Figure 16:
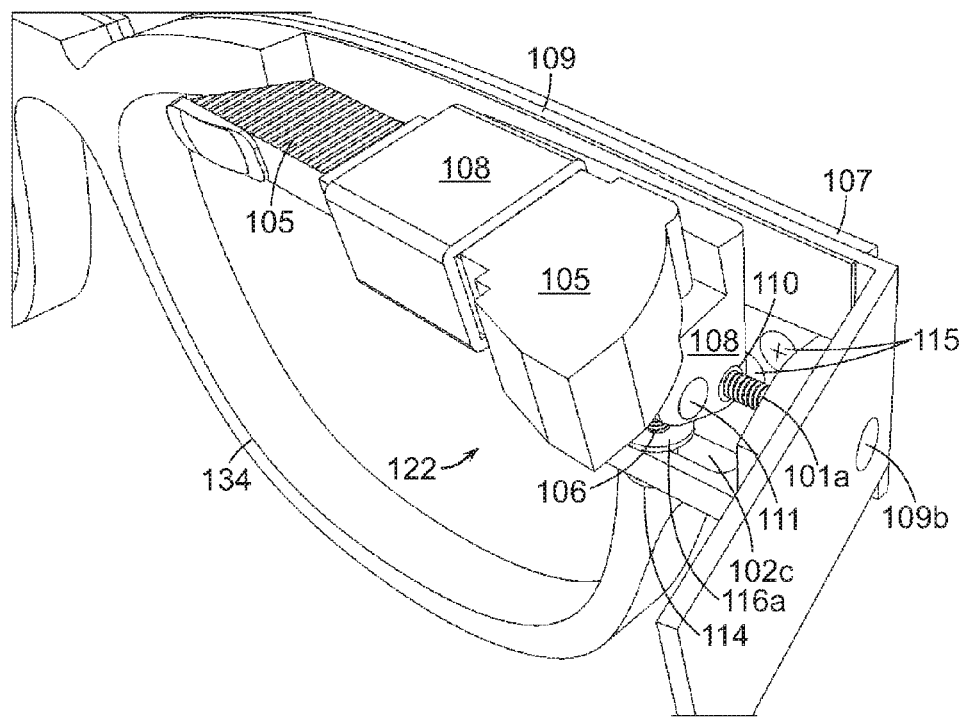
FIG. 16 is an upper perspective view of an embodiment of the display module and adjustment mechanism mounted to the eyewear frame.

Angle of View Tilt Drum: Angle of view rotation of the pupil mechanism 105 can be achieved with the angle of view tilt drum 111 (FIGS. 17 and 17A) and its engagement with the angle of view tilt drum screw 106 (FIGS. 13 and 13A). As the tilt drum screw turns clockwise and counterclockwise the pupil mechanism rotates to meet the wearer's gaze. The tilt drum threads 111*a* and concentric design of the drum can allow for rotational movement.

Sleeve Bearing: The sleeve bearing 112 (FIG. 14) can function as a means to prevent the support harness 108 and base 108*a* from becoming immovable when contacting the inner face of the housing bracket, and for creating a concentric location for linear travel to be located. The sleeve bearing 112 has a flange 112*b* and inner hole 112*a* (FIG. 13), and is mounted into the sleeve bearing mounting hole 102*b*. The sleeve bearing hole 112*a* can provide a tight concentric location for the IPD screw journal 101*b* to rest.

Lock Washer: The lock washer 113 (FIG. 15) can stabilize and prevent the IPD screw 101 (FIGS. 13 and 13A) from backing out.

Washer: The washer 114 (FIGS. 17 and 17A) can act as a support for the angle of view adjustment screw 106 and can be locked into position by the downward pressure of the flanged bushing 116 (FIG. 13).

Assembly Screws: The assembly screws 115 (FIGS. 13 and 13A) can travel through the assembly screw support holes 102*d*, the frame chassis bracket holes 107*b* (FIG. 15), and the brow bar bracket holes 109*a* to secure the housing bracket and ancillary components.

Flanged Bushing with Internal Threading: The flanged bushing with internal threading 116 (FIGS. 13 and 13A) can slide into the tilt guide track 102*c* and screws tightly against the top face of the washer 114 via the angle of adjustment screw 106. The bushing length can be slightly longer than the depth of the tilt guide track 102*c*, which allows the washer top face and bushing to tighten again each other, which in turn can cause the angle of adjustment screw 106, washer 114, and flanged bushing with internal threading 116 to become one assembled piece. This may also be achieved via an adhesive process.

In other embodiments in the present invention, referring to FIGS. 20-24, an electronic eyewear viewing system or device 220 can be a computer integrated eyeglass system including an adjustable display assembly 222, having a display module 235 with an active matrix display or microdisplay 226, and an adjustment mechanism 236, mounted to an eyewear, spectacle or eyeglass frame 234. The eyewear frame 234 can generally include a front eyewear frame portion or frame chassis 207, which is connected to a first or right, and a second or left side frame portions stems or temples. The right temple 206 can be seen but not the left temple in FIGS. 20-24.

The microdisplay 226 can be similar to those previously described. The microdisplay 226 can be electronically, processor or computer driven, and can display images 232 including text and/or video on a small display screen or image exit window 230 along optical axis O. The exit window 230 can be positioned along a first lateral axis $L_1$.

The adjustment mechanism 236 of the adjustable display assembly 222 can be mechanically adjustable and can adjust the position of the image exit window 230 and optical axis O of the display module 235, incrementally latterly in a linear direction along the first lateral axis $L_1$ in the direction of arrows 228, while incrementally adjusting the linear position of the display module 235 along a fifth lateral axis $L_5$. The fifth lateral axis $L_5$ can be parallel to the first lateral axis $L_1$, being spaced above and offset to the side of the first lateral axis $L_1$. The adjustment mechanism 236 can also incrementally pivotably or rotatably adjust the position of the image exit window 230, optical axis O and display module 235 about or around a pivot joint 237 along a second lateral axis $L_2$, in the direction of arrows 224, to pivot, rotate, angle or tilt image exit window 230 and optical axis O to the user's eyes, such as slightly angled or tilted downwardly. The exit window 230 can move concentrically about and below the second lateral axis $L_2$ along a generally circular or curved swinging, rotating or pivoting path having a radius $R_1$ (FIG. 23), which is the distance between axes $L_1$ and $L_2$. The second lateral axis $L_2$ can be generally on a common horizontal plane or level with the fifth lateral axis $L_5$ and spaced apart therefrom on the opposite side of axis $L_5$ from axis $L_1$ and above axis $L_1$.

The adjustable display assembly 222 can include the display module 235, microdisplay 226, and an adjustment mechanism 236, mounted to a first or right corner of the eyewear frame 234. The display module 235 can have, include or be a pupil mechanism 205 with a housing or pupil mechanism housing 205b which can have, include, be, or contain the microdisplay 226. A pivoting mechanism, device or member, or multi-directional motion clip 202 can be mounted, connected, attached, secured or extended from an upper surface of the housing 205b. In some embodiments, the motion clip 202 and/or adjustment mechanism 236 can be considered part of the display module 235.

The motion clip 202 can have first or upper 202U and second or lower 202L portions or arms. The upper 202U and lower 202L arms can be integrally formed together and can each include generally rectangular planar members that are connected together at one side or edge at a motion clip stabilizing flange 202a generally in a vee or wedge shaped configuration or structure. The lower arm 202L can be mounted, connected, attached, secured or extended from the upper surface of the housing 205b or the display module 235. The stabilizing flange 202a can have a folded linear edge that can be parallel to axes $L_1$, $L_2$ and $L_5$. The upper arm 202U can have two spaced apart track flanges or members 202d with threaded holes on opposite ends thereof, aligned along the fifth lateral axis $L_5$, forming a threaded interpupillary (IPD) screw alignment track or guide for engaging a lateral motion or interpupillary distance (IPD) adjustment screw 201 extending along axis $L_5$. The flanges 202d can extend below the upper arm 202U between arms 202U and 202L. The lower arm 202L can have a threaded tilt guide tab or member 202c extending centrally from the opposite side or edge from stabilizing flange 202a towards the upper arm 202U. The tilt guide tab 202c can have a threaded tilt guide hole or opening 202f. An angle of view or rotational position adjustment screw 203 can rotatably engage threaded hole 202f in the tab 202c in lower arm 202L while being rotatably secured through or in a tilt screw hole 202b in the upper arm 202U by a lock nut 204, along an upright or generally vertical axis U. The lower arm 202L of the motion clip 202 can have a slight fold or bend line extending along the second lateral axis $L_2$ slightly inward from the folded linear edge, which can form the pivot joint 237. The lower arm 202L can pivot, bend or deform upwardly or downwardly along pivot joint 237 and the second lateral axis $L_2$, to allow the lower arm 202L to pivot, rotate or move towards and/or away from the upper arm 202U by rotation of the angle of view adjustment screw 203. The pivot joint 237 can have a concise angle bend line that forms an obtuse angle on the underside of the lower arm 202L relative to the underside plane of the motion clip 202e, to provide the pivot joint 237 with a defined bendable hinge that pivots consistently along the second lateral axis $L_2$. In some embodiments, the lower arm 202L and/or the upper arm 202U can be considered to be leaf springs. The adjustment screw 203 and vertical axis U can be perpendicular and offset from axis $L_2$ by a distance $R_2$. In some embodiments, the pivot joint 237 can have a narrow precise bend line extending along the second lateral axis $L_2$, and in other embodiments, the pivot joint 237 can have a wider bend line. In some embodiments, the lower arm 202L and/or the motion clip 202 can be formed as part of housing 205b, and can be integrally formed therewith.

The frame chassis 207 of the eyewear frame 234 can have a recess or pupil mechanism clearance cavity 207b on the first or right upper side or corner to provide space for recessing the display module 235 and/or the housing 205b of the pupil mechanism 205 while allowing the display module 235 and/or pupil mechanism 205 to move, translate, swing, rotate and/or pivot therein. In some embodiments, the recess 207b can extend into the front portion of the frame chassis 207. The front right upper rim portion of the frame chassis 207 can include a lateral motion clip guide channel, slot, slide or track 207g for slidably receiving the stabilizing flange 202a of the motion clip 202. The motion clip 202 can slide linearly laterally within the clip guide channel 207g to guide lateral movement of the display module 235 and exit window 230 along a fixed linear path. The clip guide channel 207g can have elongate flat bottom and edge surfaces for slidably engaging the bottom and side edge of the stabilizing flange 202a of the motion clip 202. The angled bend of the pivot joint 237 along the second lateral axis $L_2$ can engage the outer corner of the bottom of the clip guide channel 207g and provide an elongate linear leverage pivot edge over which the lower arm 202L can pivot or bend over or around. The clip guide channel 207g can align the second lateral axis $L_2$ of the pivot joint 237 of the motion clip 202 parallel to the fifth lateral axis $L_5$ and generally on a common horizontal or lateral plane.

The clip guide channel 207g can extend between two end members, structures or stops, which can act as end stops for limiting the amount of lateral adjustment of the motion clip 202, as well as rotatably securing the opposite ends of the IPD adjustment screw 201 therebetween along the fifth lateral axis $L_5$. A protruding shoulder, ledge or structure such as an IPD screw reinforcement guide 207f can be a first end member and can extend from the upper front and right side of the frame chassis 207 inwardly, and have a flat side wall surface perpendicular to the direction of travel of the clip guide channel 207g to act as a right side end stop for movement of the motion clip 202 to the right. The reinforcement guide 207f can also have an IPD screw thumbwheel cavity 207e aligned with the fifth lateral axis $L_5$, with a larger cavity inset into the reinforcement guide 207f for accepting the IPD adjustment screw thumbwheel or head 201a, and a smaller opening through the sidewall of the right side end stop, for rotatably trapping or securing the thumbwheel 201a in the thumbwheel cavity 207e. A protruding shoulder, ledge or structure such as an extruded frame chassis ledge 207c can be a second end member and can extend inwardly from the upper front of the frame chassis 207. Ledge 207c can have a flat side wall surface perpendicular to the direction of travel of the clip guide channel 207g, and spaced apart from the reinforcement guide 207f to provide a left side end stop for movement of the motion clip 202 to the left. The ledge 207c can have a IPD adjustment screw journal hole, opening or bore 207h in the flat side wall surface aligned with the fifth lateral axis $L_5$ facing opposite to the thumbwheel cavity 207e and reinforcement guide 207f, for accepting and rotatably securing the IPD adjustment screw journal 201b. As a result, the IPD adjustment screw 201 can be trapped in place in the longitudinal direction along the fifth lateral axis $L_5$ as well sideways thereof, while allowing rotation around axis $L_5$. Since an IPD adjustments screw 201 engages flanges 202d of the motion clip 202, the motion clip 202 can be constrained by the clip guide channel 207g and the IPD adjustment screw 201. Motion along axis $L_5$ can be actuated, caused or permitted by rotation of IPD adjustment screw 201. In some embodiments, ledge 207c can be removably attachable to frame chassis 207 for assembly purposes, and does not have to be extruded.

The ledge 207c can have an angled outer surface. The IPD adjustment screw 201, flanges of alignment track 202d, cavity 207e, journal 207h, and the fifth lateral axis $L_5$ are aligned with each other and can be aligned to be on or near a lateral plane coinciding with clip guide channel 207g, such as the bottom of the clip guide channel 207g. As a result, the motion clip 202 can be positioned between the ledge 207c and reinforcement guide 207f with the pupil mechanism 205 being positioned below the ledge 207c and guide 207f by extending the lower arm 202L of the motion clip 202 below the clip guide channel 207g, and members 207c and 207f.

An upper motion mechanism concealment cover 208 can be secured over the adjustment mechanism 236. The cover 208 can be a generally flat triangular piece or member having fastening tabs 208a and 208b for engaging or snapping into mating holes 207a and 207d on the upper surfaces of the frame chassis 207 and ledge 207c for securement. In some embodiments, the motion clip 202 and adjustment mechanism 236 and/or the cover 208 can be considered part of the frame chassis 207. In some embodiments, the adjustable display assembly 222 can be positioned at the left side of eyeglass frame 234.

In use, for adjusting the lateral position of the exit window 230 and optical axis O along the first lateral axis $L_1$ to adjust to the user's interpupilary distance, cover 208 can be removed, and the thumbwheel 201a of IPD adjustment screw 201 can be rotated clockwise or counterclockwise. The rotation of the IPD adjustment screw 201, moves the motion clip 202 laterally via engagement with the threaded holes of track flanges 202d, thereby moving exit window 230 and optical axis O laterally incrementally in the direction of arrows to 228 along axis $L_1$ either to the left or right. The extent of lateral adjustment to the left or right is limited by end stops formed by members 207c and 207f.

For adjusting the tilt, angle, pivotal or rotational position of the exit window 230 and optical axis O, the user can rotate the angle of view adjustment screw 203 clockwise or counterclockwise to bend, move, rotate or pivot the lower arm 202L of motion clip 202 downwardly from or upwardly towards the upper arm 202U, while the upper arm 202U remains fixed or constrained on the horizontal or lateral plane extending between axes $L_2$ and $L_5$, by guide channel 207g and IPD screw 201. Moving the lower arm 202L downwardly angles, pivots or rotates the exit window 230 and optical axis O downwardly about the second lateral axis $L_2$ of the motion clip 202. Moving the lower arm 202L upwardly angles, pivots or rotates the exit window 230 and optical axis O upwardly about axis $L_2$. Since the exit window 230 is aligned along axis $L_1$, and rotates around axis $L_2$ which is spaced apart from axis $L_1$ by distance $R_1$, the exit window 230 can be adjusted in a curved path with the radius $R_1$ that is a larger radius and with a more gradual tilt adjustment than if tilted about axis $L_1$. In addition, since the adjustment screw 203 is offset away from the pivot joint 237 and the second lateral axis $L_2$ by a distance $R_2$, gradual incremental adjustment can be further provided by the rotating threads of screw 203. Since the pivot joint 237 is a joint that rotates by bending the lower arm 202L, backlash or play in the pivot joint 237 can be eliminated or minimized, which can provide for better or consistent adjustment and viewing. In some embodiments, the pivot joint 237 does not have to be an integral bendable joint, and the arms 202U and 202L can be two separate pieces that are rotatably connected together about the second lateral axis $L_2$, such as around a shaft. In some embodiments, the threaded interpupillary (IPD) screw alignment track can have only one threaded track flange or member 202d. In some embodiments, the cover 208 can have openings over the screw 203 and thumbwheel 201a to allow adjustment with the cover 208 on.

Additional description of embodiments shown in FIGS. 20-24 in the present invention now follows, which can be described as an adjustable and multidirectional motion mechanism for accommodating (IPD) interpupillary distance and angle of view for a computer-based eyewear system. The invention can allow the user to customize the location of a microdisplay for both angle of view and interpupillary distance. Both "x" axis motion (horizontal IPD adjustment) and vertical/rotational "y" axis motion (angle of view) can be fine-tuned independently. The description below can use some different terms and reference numerals than used above. The multidirectional mechanism can be integrated into an eyewear frame chassis from an assembly of the following components:

201 Interpupillary Adjustment Screw (IPD Screw)
202 Multidirectional Motion Clip
203 Angle of View Tilt Screw
204 Lock Nut
205 Pupil Mechanism
206 Right Temple
207 Frame Chassis
208 Motion Mechanism Concealment Cover
201a IPD Adjustment Screw Thumbwheel
201b IPD Adjustment Screw Journal
202a Motion Clip Stabilizing Flange
202b Tilt Screw Hole
202c Threaded Tilt Guide Tab
202d Threaded IPD Screw Alignment Track Flange
202e Underside Plane of Motion Clip
202f Threaded Tilt Guide Hole
203a Angle of View Tilt Screw Threads
205a Pupil Flex Exit
205b Pupil Mechanism Housing
207a Concealment Cover Hole
207b Pupil Mechanism Clearance Cavity
207c Extruded Frame Chassis Ledge
207d Concealment Over Hole
207e IPD Screw Thumbwheel Cavity
207f IPD Screw Reinforcement Guide
207g Motion Clip Guide Channel
207h IPD Adjustment Screw Journal Hole
208a Concealment Cover Fastening Tabs
208b Concealment Cover Fastening Tabs Interpupillary Adjustment Screw (IPD Screw): The IPD screw 201 can include the thumbwheel 201a, threads, and journal 201b. The IPD screw can be stabilized and threaded into the alignment track and flanges 202d of the motion clip 202. When the IPD screw 201 is engaged in a clockwise or counterclockwise direction by way of the thumbwheel 201a, the interpupillary adjustment screw (IPD screw) 201 can actuate linear motion of the pupil mechanism 205, housing 205b, and motion clip 202, which in turn provides incremental adjustment of the user's interpupillary distance. Once the IPD screw 201 is threaded into the motion clip 202, the IPD screw journal 201b and thumbwheel 201a can be positioned in the journal hole 207h and thumbwheel cavity 207e for stabilization. The IPD adjustment screw 201 can be the primary means by which horizontal linear motion is engaged.

Multidirectional Motion Clip: The multidirectional motion clip 202 can include two threaded alignment track flanges 202d for the IPD screw 201, and a threaded tilt guide tab 202c. The motion clip 202 features a stabilizing flange 202a, which slides in the guide channel 207g of the frame chassis 207. The total linear distance traveled by the motion clip can be dependent on the extruded frame chassis ledge 207c and IPD screw reinforcement guide 207f Once assembled, the underside plane of the motion clip 202e can be attached directly to the housing of the pupil mechanism 205b, allowing the clip and pupil to move as one unit.

Angle of View Tilt Screw: The angle of view tilt screw 203 can be the primary method of adjusting the angle of view of the microdisplay. The tilt screw can be inserted into the tilt screw hole 202b and secured in place with the lock nut 204. After the lock nut is secured, the tilt screw can be threaded into the guide hole 202f. When adjusted clockwise or counterclockwise the angle of view tilt screw 203 either increases the angle using downward pressure on the bottom portion of the motion clip 202e, or decreases the angle of the clip to narrow when turned in the opposite direction. The pupil mechanism housing 205b can be secured in final assembly to the underside plane of the motion clip 202e, and the two independent units can behave as one when moving.

Lock Nut: The Lock Nut 204 can be positioned between the tilt screw hole 202b and threaded tilt guide tab 202c. The lock nut can be threaded on, and permanently fused to the angle of view tilt screw 203, prohibiting the adjustment screw from exiting the motion clip.

Pupil Mechanism: The pupil mechanism 205 can house the optics, electronics, and microdisplay. A purpose of the invention can be to accommodate both longitudinal and latitudinal movement of this mechanism for customization of the viewer's interpupillary distance and rotational angle of view. The pupil housing 205b can be attached to the underside plane of the motion clip 202e to facilitate movement of the clip and pupil as one. The flex exit 205a can allow for the electronics to seamlessly integrate into the right temple by way of chassis's clearance cavity 207b.

Right Temple: The right temple 206 of the eyewear may house additional electronics including, but not limited to, wired and/or wireless technology components.

Frame Chassis: The frame chassis 207 can be ophthalmically constructed to accommodate prescription lenses, plano lenses, sun lenses, or a combination thereof. The chassis can include an extruded frame chassis ledge 207c and IPD screw reinforcement guide 207f, both of which support the stability and positioning of the assembled motion clip 202. In combination with one another, the IPD screw thumbwheel cavity 207e, IPD adjustment screw journal hole 207h, and motion clip guide channel 207g create a method and structure to secure and stabilize the motion clip assembly.

Motion Mechanism Concealment Cover: The motion mechanism concealment cover 208 can protect the multidirectional motion clip and assembly from unwanted movement and debris. The concealment cover fastening tabs 208a and 208b can be inserted into the cover holes of the frame chassis 207a and 207d to ensure a secure fit. Additional fastening methods may also be used to provide downward pressure on the motion clip.

While this invention has been particularly shown and described with references to example embodiments thereof, it will be understood by those skilled in the art that various changes in form and details may be made therein without departing from the scope of the invention encompassed by the appended claims. Various features and components of the different embodiments can be combined together, interchanged or omitted. In addition, although some components have been described with orientational terms, this is not intended to limit the orientation of embodiments of the eyewear devices in the present invention.

What is claimed is:

1. An electronic eyewear viewing device comprising:
   a display module having a microdisplay for viewing images, the microdisplay having an exit window aligned along a first lateral axis $L_1$, the display module having a pivot joint along a second lateral axis $L_2$ parallel to and spaced apart a distance from the first lateral axis $L_1$, the display module being rotatable about the pivot joint;
   a lateral position adjustment screw mounted and rotatably secured to the display module for laterally adjusting position of the display module; and
   a rotational position adjustment screw mounted along a transverse axis that is transverse to the second lateral axis $L_2$ and rotatably secured to the display module at a location offset from the second lateral axis $L_2$ for adjusting rotational position of the display module about the pivot joint along the second lateral axis $L_2$, the distance that the exit window of the microdisplay along the first lateral axis $L_1$ is spaced apart from the pivot joint and the second lateral axis $L_2$ providing a larger radius of rotation for the exit window than if the exit window was positioned along the second lateral axis $L_2$.

2. The device of claim 1 in which the lateral position adjustment screw is mounted along the second lateral axis $L_2$ and rotatably secured to the pivot joint of the display module for laterally adjusting position of the display module along the second lateral axis $L_2$.

3. The device of claim 2 in which the second lateral axis $L_2$ is positioned below the first lateral axis $L_1$, and the transverse axis is in an upright orientation generally perpendicular to the second lateral axis $L_2$.

4. The device of claim 3 in which the lateral position adjustment screw has screw threads which engage mating threads of a lateral movement sleeve positioned at the pivot joint of the display module along the second lateral axis $L_2$ for providing lateral adjustment of the display module, and the rotational adjustment screw has screw threads which engage mating threads of a rotational movement sleeve positioned in the display module and rotationally mounted along a third lateral axis $L_3$ parallel to and spaced apart from the second lateral axis $L_2$, the rotational movement sleeve rotating about the third lateral axis $L_3$ to allow the screw threads of the rotational adjustment screw to engage the mating threads of the rotational movement sleeve as rotational position of the display module is adjusted.

5. The device of claim 4 further comprising a frame, the display module being rotatably mounted at the pivot joint along the second lateral axis $L_2$ to the frame by the lateral position adjustment screw, the frame having a lateral track extending along a fourth lateral axis $L_4$ parallel to and spaced below the third lateral axis $L_3$, the rotational position adjustment screw being slidably mounted to the lateral track to move with lateral adjustment of the display module.

6. The device of claim 5 in which the frame comprises an eyewear frame.

7. The device of claim 5 in which the frame comprises a display housing bracket for mounting to an eyewear frame.

8. The device of claim 7 in which the frame further comprises a brow bar bracket mounted to the eyewear frame to which the display housing bracket is mounted.

9. The device of claim 1 in which the pivot joint pivotably connects together first and second arms of a pivoting mechanism along the second lateral axis $L_2$, the rotational position adjustment screw being mounted to the first and second arms for adjusting the rotational position of the first and second arms relative to each other for adjusting the rotational position of the display module.

10. The device of claim 9 in which the pivoting mechanism is secured to a housing of the microdisplay.

11. The device of claim 10 in which the first and second arms are integrally formed together, the pivot joint comprising a bendable section extending along the second lateral axis $L_2$ that bends to pivot the first and second arms relative to each other.

12. The device of claim 11 in which the first and second arms are upper and lower arms, respectively, the lateral position adjustment screw being rotatably secured to the upper arm for laterally adjusting position of the display module and the lower arm being secured to the housing of the microdisplay, rotation of the rotational position adjustment screw adjusting rotational position of the display module.

13. The device of claim 12 further comprising an eyewear frame, the pivoting mechanism being slidably mounted to the eyewear frame between two end stops, the lateral position adjustment screw being rotatably secured between the two end stops and to the upper arm of the pivoting mechanism positioned between the two end stops.

14. A method of adjusting a display module of an electronic eyewear viewing device, the display module having a microdisplay for viewing images, the microdisplay having an exit window aligned along a first lateral axis $L_1$, the method comprising:
providing the display module with a pivot joint aligned along a second lateral axis $L_2$ that is parallel to and spaced apart a distance from the first lateral axis $L_1$, the display module being rotatable about a pivot joint;
adjusting lateral position of the display module with a lateral position adjustment screw rotatably secured to the display module; and
adjusting rotational position of the display module about the pivot joint along the second lateral axis $L_2$ with a rotational position adjustment screw mounted along a transverse axis that is transverse to the second lateral axis $L_2$ and rotatably secured to the display module at a location offset from the second lateral axis $L_2$, the distance that the exit window of the microdisplay along the first lateral axis $L_1$ is spaced apart from the pivot joint and the second lateral axis $L_2$ providing a larger radius of rotation for the exit window than if the exit window was positioned along the second lateral axis $L_2$.

15. The method of claim 14 further comprising adjusting lateral position of the display module along the second lateral axis $L_2$ with a lateral position adjustment screw mounted along the second lateral axis $L_2$ and rotatably secured to the pivot joint of the display module.

16. The method of claim 15 further comprising positioning the second lateral axis $L_2$ below the first lateral axis $L_1$, and the transverse axis in an upright orientation generally perpendicular to the second lateral axis $L_2$.

17. The method of claim 16 further comprising:
engaging screw threads of the lateral position adjustment screw with mating threads of a lateral movement sleeve positioned at the pivot joint of the display module along the second lateral axis $L_2$ for providing lateral adjustment of the display module; and
engaging screw threads of the rotational adjustment screw with mating threads of a rotational movement sleeve positioned in the display module that is rotationally mounted along a third lateral axis $L_3$ parallel to and spaced apart from the second lateral axis $L_2$, the rotational movement sleeve rotating about the third lateral axis $L_3$ to allow the screw threads of the rotational adjustment screw to engage the mating threads of the rotational movement sleeve as rotational position of the display module is adjusted.

18. The method of claim 17 further comprising:
rotatably mounting the display module at the pivot joint along the second lateral axis $L_2$ to a frame by the lateral position adjustment screw; and
slidably mounting the rotational position adjustment screw to a lateral track of the frame extending along a fourth lateral axis $L_4$ parallel to and spaced below the third lateral axis $L_3$.

19. The method of claim 18 further comprising providing an eyewear frame as the frame.

20. The method of claim 18 further comprising providing the frame with a display housing bracket for mounting to an eyewear frame.

21. The method of claim 20 further comprising providing the frame with a brow bar bracket mounted to the eyewear frame to which the display housing bracket is mounted.

22. The method of claim 14 further comprising pivotably connecting together first and second arms of a pivoting mechanism with the pivot joint along the second lateral axis $L_2$, the rotational position adjustment screw being mounted to the first and second arms for adjusting the rotational position of the first and second arms relative to each other for adjusting a rotational position of the display module.

23. The method of claim 22 further comprising securing the pivoting mechanism to a housing of the microdisplay.

24. The method of claim 23 further comprising:
integrally forming the first and second arms together, the pivot joint comprising a bendable section extending along the second lateral axis $L_2$; and
bending the pivot joint to pivot the first and second arms relative to each other.

25. The method of claim 24 in which the first and second arms are upper and lower arms, respectively, the method further comprising:
rotatably securing the lateral position adjustment screw to the upper arm for laterally adjusting position of the display module; and
securing the lower arm to the housing of the microdisplay, rotation of the rotational position adjustment screw adjusting rotational position of the display module.

26. The method of claim 25 further comprising slidably mounting the pivoting mechanism to an eyewear frame between two end stops, the lateral position adjustment screw being rotatably secured between the two end stops and to the upper arm of the pivoting mechanism positioned between the two end stops.

* * * * *